United States Patent
Nakahata et al.

(10) Patent No.: US 10,122,288 B2
(45) Date of Patent: Nov. 6, 2018

(54) TRANSFORMER COMPOSED OF A FRONT STAGE CIRCUIT AND A REAR STAGE CIRCUIT

(71) Applicants: Sumitomo Electric Industries, Ltd., Osaka-shi (JP); NATIONAL UNIVERSITY CORPORATION TOYOHASHI UNIVERSITY OF TECHNOLOGY, Toyohashi-shi (JP)

(72) Inventors: Hideaki Nakahata, Osaka (JP); Kenichi Hirotsu, Osaka (JP); Takashi Ohira, Toyohashi (JP); Kyohei Yamada, Toyohashi (JP); Daiya Egashira, Toyohashi (JP)

(73) Assignees: Sumitomo Electric Industries, Ltd., Osaka-shi (JP); National University Corporation Toyohashi University of Technology, Toyohashi-shi (JP)

( * ) Notice: Subject to any disclaimer, the term of this patent is extended or adjusted under 35 U.S.C. 154(b) by 0 days.

(21) Appl. No.: 15/509,296

(22) PCT Filed: Oct. 9, 2015

(86) PCT No.: PCT/JP2015/078736
§ 371 (c)(1),
(2) Date: Mar. 7, 2017

(87) PCT Pub. No.: WO2016/072213
PCT Pub. Date: May 12, 2016

(65) Prior Publication Data
US 2017/0288559 A1 Oct. 5, 2017

(30) Foreign Application Priority Data
Nov. 5, 2014 (JP) .................. 2014-225426

(51) Int. Cl.
*H02M 5/12* (2006.01)
*H02M 5/22* (2006.01)

(52) U.S. Cl.
CPC ............... *H02M 5/12* (2013.01); *H02M 5/22* (2013.01)

(58) Field of Classification Search
None
See application file for complete search history.

(56) References Cited

U.S. PATENT DOCUMENTS

| 4,203,151 A | 5/1980 | Baker |
| 5,652,546 A | 7/1997 | Dent |

(Continued)

FOREIGN PATENT DOCUMENTS

| CN | 1063892 C | 3/2001 |
| CN | 2798411 Y | 7/2006 |

(Continued)

OTHER PUBLICATIONS

Yamada, et al., "Load-Invariant Constant-Voltage-Ratio Transformer without Employing Mutual Inductance" 2013 Proceedings of the Society Conference of IEICE B-9-3, XP008182819, Sep. 17, 2013, p. 202 [Cited in EESR].

(Continued)

*Primary Examiner* — Adolf Berhane
*Assistant Examiner* — Henry Lee, III
(74) *Attorney, Agent, or Firm* — Venable LLP; Michael A. Sartori; Laura G. Remus

(57) ABSTRACT

A transformer includes a front stage circuit and a rear stage circuit. As a front stage circuit, a switch series unit, which is connected in parallel to a power supply, includes odd-numbered switches and even-numbered switches alternately turned ON. Mutual connection points of the respective switches and points at both ends of the switch series unit are (Continued)

regarded as m nodes in total. Capacitors are provided on at least one of a first electrical path combining odd nodes to lead them to a first output port, and a second electrical path combining even nodes to lead them to a second output port. The capacitors are present so as to correspond to at least (m−1) nodes. The rear stage circuit includes an element series unit, which is composed of a pair of semiconductor elements connected in series to each other for conducting operations of mutually opposite polarities, and necessary inductors.

5 Claims, 44 Drawing Sheets

(56) References Cited

U.S. PATENT DOCUMENTS

| | | | |
|---|---|---|---|
| 5,850,337 A | 12/1998 | Lee | |
| 6,462,962 B1* | 10/2002 | Cuk | H02M 1/34 363/131 |
| 8,391,038 B2 | 3/2013 | Zacharias et al. | |
| 8,693,224 B1 | 4/2014 | Giuliano | |
| 8,829,866 B2 | 9/2014 | Lethellier | |
| 9,667,139 B2 | 5/2017 | Giuliano et al. | |
| 2004/0057258 A1 | 3/2004 | Dobrowolski | |
| 2005/0030767 A1 | 2/2005 | Phadke et al. | |
| 2008/0013351 A1 | 1/2008 | Alexander | |
| 2009/0278520 A1 | 11/2009 | Perreault et al. | |
| 2010/0202176 A1 | 8/2010 | Hallak | |
| 2011/0049991 A1* | 3/2011 | Sato | H02M 1/44 307/48 |
| 2013/0134777 A1* | 5/2013 | de Sousa | B60L 11/1805 307/10.1 |
| 2014/0063884 A1* | 3/2014 | Itoh | H02M 7/487 363/132 |
| 2014/0063885 A1* | 3/2014 | Itoh | H02M 7/487 363/132 |
| 2014/0239736 A1 | 8/2014 | Kai et al. | |
| 2016/0129796 A1* | 5/2016 | Tomura | B60K 6/445 701/22 |
| 2016/0181937 A1 | 6/2016 | Nakahata et al. | |
| 2016/0234901 A1 | 8/2016 | Delos Ayllon et al. | |

FOREIGN PATENT DOCUMENTS

| | | |
|---|---|---|
| CN | 104426381 A | 3/2015 |
| CN | 104426382 A | 3/2015 |
| DE | 202011102068 U1 | 9/2012 |
| EP | 3041124 A1 | 7/2016 |
| GB | 0755219 A | 8/1956 |
| JP | 2002-095241 A | 3/2002 |
| JP | 2010-074931 A | 4/2010 |
| JP | 2013-146181 A | 7/2013 |
| WO | 2015/037455 A1 | 3/2015 |

OTHER PUBLICATIONS

Extended Search Report issued in related European Patent Application No. 14843360.0, dated Apr. 13, 2017.
First Office Action issued in related Chinese Patent Application No. 201410460772.3, dated Aug. 25, 2017.
Homepage of Chuba Electric Power Co., Inc., [Pole Transformer], [online], Internet <URL:http://www.chuden.co.jp/kids/kids_denki/home/hom_kaku/index/html> [searched on Sep. 12, 2014].
Falcones et al., "Topology Comparison for Solid Transformer Implementation," Power Energy Society General Meeting, 2010 IEEE, pp. 1-8, Minneapolis, Jul. 2010.
International Search Report in International Application No. PCT/JP2014/072706 dated Nov. 25, 2014.
International Search Report in International Application No. PCT/JP2015/078731 dated Dec. 8, 2015.
International Search Report in counterpart International Application No. PCT/JP2015/078736 dated Dec. 8, 2015.
U.S. Appl. No. 14/911,245, filed Feb. 9, 2016 [Related application].
U.S. Appl. No. 15/509,313, filed Mar. 7, 2017 [Related application].
Office Action issued in U.S. Appl. No. 14/911,245, dated Sep. 22, 2017 [Related Application].
Office Action issued in U.S. Appl. No. 15/509,313, dated Sep. 28, 2017 [Related Application].
Sun et al., "Unified Analysis of Half-Bridge Converters with Current-Doubler Rectifier," IEEE, 2001, pp. 514-520 [Office Action issued in U.S. Appl. No. 14/911,245, dated Sep. 22, 2017].
Office Action issued in U.S. Appl. No. 14/911,245, dated Mar. 28, 2018 [Related Application].
Notice of Allowance issued in U.S. Appl. No. 15/509,313, dated Mar. 12, 2018 [Related application].
Supplemental Notice of Allowance in U.S. Appl. No. 15/509,313, dated Jul. 25, 2018.
Office Action issued in U.S. Appl. No. 14/911,245, dated Jul. 31, 2018.

* cited by examiner

TRANSFORMER COMPOSED OF A FRONT STAGE CIRCUIT AND A REAR STAGE CIRCUIT

TECHNICAL FIELD

The present invention relates to a transformer.

BACKGROUND ART

In a commercial AC transmission and distribution system, a transformer is used. Just near a consumer's house, a pole transformer is used which transforms, for example, 6600 V (50 Hz or 60 Hz) to 200 V (see NON PATENT LITERATURE 1). Such a pole transformer has a thick coil as a conductive wire wound around an iron core, and therefore has a considerable weight. For example, a pole transformer with a diameter of 40 cm and a height of 80 cm has a weight of about 200 kg, including an insulating oil and a case.

On the other hand, for realizing a smart grid which is a next-generation power system, studies of an SST (Solid-State Transformer) are being conducted. For the SST, a high-frequency transformer is used (for example, see NON PATENT LITERATURE 2).

In recent years, there is a demand that, for example, output voltage (DC) of photovoltaic generation is stepped down to be used for a low-voltage power supply for measurement. There are cases where the output voltage of photovoltaic generation is as high as 1000 V. In order to step down such high voltage to about 100 to 200 V, an intervening device such as a step-down transformer is needed as in an AC circuit.

CITATION LIST

Non Patent Literature

NON PATENT LITERATURE 1: Homepage of Chubu Electric Power Co., Inc., [Pole Transformer], [online], [searched on Sep. 12, 2014], Internet <URL:http://www.chuden.co.jp/kids/kids_denki/home/hom_kaku/index.html>

NON PATENT LITERATURE 2: Falcones, S.: et al., Power and Energy Society General Meeting, 2010 IEEE, pp. 1-8, Minneapolis, July 2010

SUMMARY OF INVENTION

Technical Problem

The conventional pole transformer is heavy, and therefore is not easy to handle. In addition, an attachment space that is large enough to contain the outer dimension of the transformer is needed on the pole.

On the other hand, the high-frequency transformer cannot avoid an influence of a parasitic capacitance, and has a difficulty in designing.

Considering such conventional problems, an object of the present invention is to provide an innovative next-generation transformer with a small size and a light weight, which does not need a coil, an iron core, and the like for magnetic coupling, electromagnetic induction, or mutual inductance as used in the conventional transformer. Either an AC power supply or a DC power supply may be used.

Solution to Problem

A transformer according to the present invention is provided between a power supply and a load, and composed of a front stage circuit and a rear stage circuit. The transformer includes, as the front stage circuit, (a) a switch series unit composed of a plurality of switches, as many as a multiple of 2, connected in series with each other, the plurality of switches including odd-numbered switches and even-numbered switches as seen from one of both ends of the series unit, the odd-numbered switches and the even-numbered switches being configured to be alternately turned ON, the switch series unit as a whole being connected in parallel to the power supply, and (b) assuming that mutual connection points of the respective switches and points at the both ends of the switch series unit are regarded as m nodes in total and the nodes are seen in order of 1 to m from one of the both ends of the switch series unit, capacitors provided on at least one electrical path of a first electrical path and a second electrical path, the first electrical path being configured to combine odd nodes and lead the odd nodes to a first output port, the second electrical path being configured to combine even nodes and lead the even nodes to a second output port, the capacitors being present so as to correspond to at least (m−1) nodes. The transformer includes, as the rear stage circuit, (c) an element series unit composed of a pair of semiconductor elements that are connected in series to each other and perform conducting operations of mutually opposite polarities, one of both ends of the element series unit being connected to the first output port while the other end thereof being connected to the second output port, and (d) inductors provided on at least one electrical path of a third electrical path and a fourth electrical path, the third electrical path being configured to combine two nodes that are points at the both ends of the element series unit and to lead the two nodes to one of both ends of the load, the fourth electrical path being configured to lead one node that is a mutual connection point of the pair of semiconductor elements to the other end of the load, the inductors being present so as to correspond to at least two nodes of the three nodes in total. The transformer further includes a control section configured to control ON/OFF operations of the switches.

Advantageous Effects of Invention

According to the transformer of the present invention, it is possible to provide an innovative next-generation transformer with a small size and a light weight, which does not need a coil, an iron core, and the like for magnetic coupling, electromagnetic induction, or mutual inductance as used in the conventional transformer.

DESCRIPTION OF EMBODIMENTS

[Summary of the Embodiment]

Figure 1:
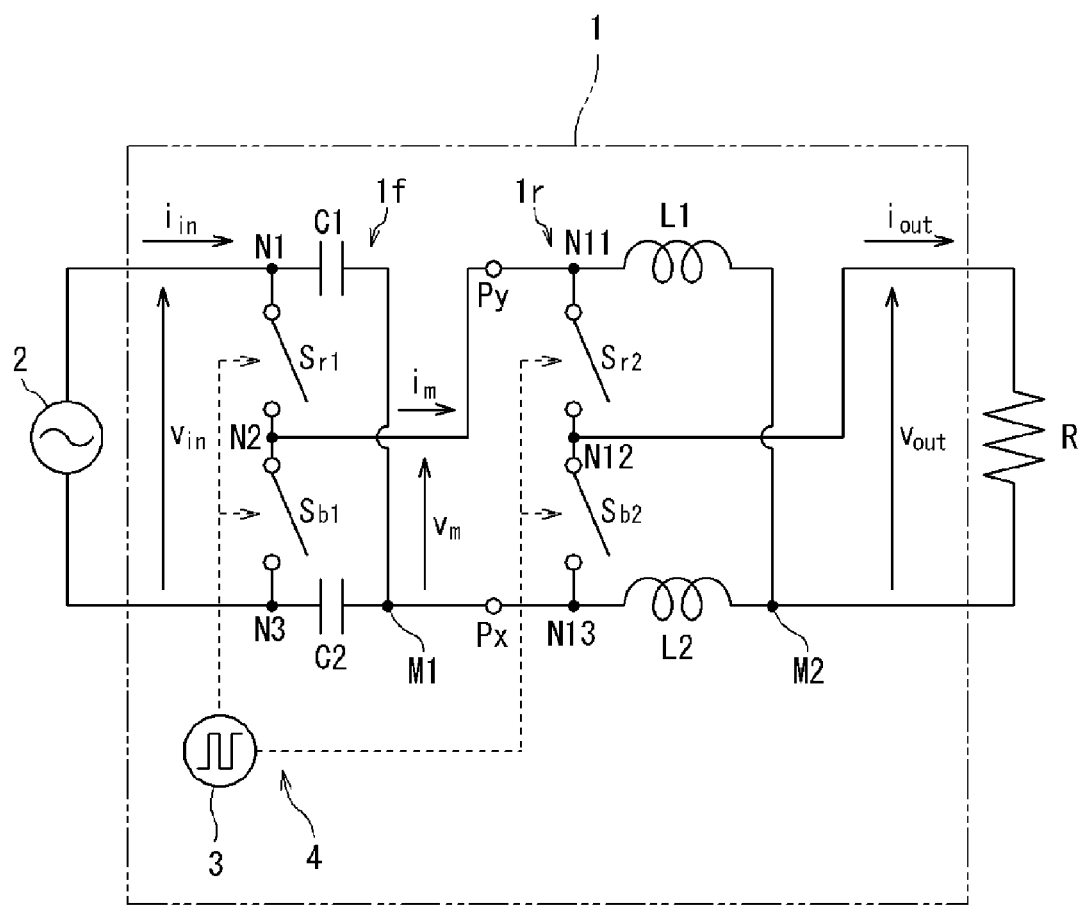
FIG. 1 is a circuit diagram showing a transformer as a basic form of a transformer according to an embodiment.

The summary of the embodiment of the present invention includes at least the following.

(1) A transformer provided between a power supply and a load is composed of a front stage circuit and a rear stage circuit.

The transformer includes, as the front stage circuit, (a) a switch series unit composed of a plurality of switches, as many as a multiple of 2, connected in series with each other, the plurality of switches including odd-numbered switches and even-numbered switches as seen from one of both ends of the series unit, the odd-numbered switches and the even-numbered switches being configured to be alternately turned ON, the switch series unit as a whole being connected in parallel to the power supply, and (b) assuming that mutual connection points of the respective switches and points at the both ends of the switch series unit are regarded as m nodes in total and the nodes are seen in order of 1 to m from one of the both ends of the switch series unit, capacitors provided on at least one electrical path of a first electrical path and a second electrical path, the first electrical path being configured to combine odd nodes and lead the odd nodes to a first output port, the second electrical path being configured to combine even nodes and lead the even nodes to a second output port, the capacitors being present so as to correspond to at least (m−1) nodes. The capacitors are present so as to correspond to at least (m−1) nodes.

In addition, the transformer includes, as the rear stage circuit, (c) an element series unit composed of a pair of semiconductor elements that are connected in series to each other and perform conducting operations of mutually opposite polarities, one of both ends of the element series unit being connected to the first output port while the other end thereof being connected to the second output port, and (d) inductors provided on at least one electrical path of a third electrical path and a fourth electrical path, the third electrical path being configured to combine two nodes that are points at the both ends of the element series unit and to lead the two nodes to one of both ends of the load, the fourth electrical path being configured to lead one node that is a mutual connection point of the pair of semiconductor elements to the other end of the load. The inductors are present so as to correspond to at least two nodes of the three nodes in total.

The transformer further includes a control section configured to control ON/OFF operations of the switches.

The transformer configured as described in above (1) can perform transformation by the circuit configuration including the front stage circuit and the rear stage circuit and by switching. Using this transformer as a power transformer makes it unnecessary to use a conventional transformer including a coil, an iron core, and the like. Therefore, it is possible to realize drastic size reduction and weight reduction of the transformer, and thereby realize cost reduction accordingly. In addition, problems of parasitic capacitance and occurrence of magnetic field leakage, which arise in a high-frequency transformer, are also solved, and thus a transformer with low loss can be realized. As for a power supply, either an AC power supply or a DC power supply is applicable.

(2) Further, in the transformer described in the above (1), it is assumed that a time period from a dead-time start time to a dead-time end time is a dead time $\tau$, the dead-time start time being a time at which control for the odd-numbered switches and control for the even-numbered switches are both turned OFF, the dead-time end time being a time at which control for either the odd-numbered switches or the even-numbered switches is turned ON. In this case, the control section, after the dead-time start time, may calculate a first half time $\tau_1$ and a second half time $\tau_2$, the first half time $\tau_1$ being calculated on the basis of electric charges that move from the inductors to floating capacitances of the switches while one of the semiconductor elements is in a conductive state, the second half time $\tau_2$ being calculated on the basis of electric charges that move from the inductors to the floating capacitances of the switches while the other semiconductor element is in a conductive state, and the control section may determine the dead time $\tau$ on the basis of the first half time $\tau_1$ and the second half time $\tau_2$.

In this case, an appropriate dead time $\tau$ can be determined on the basis of the times $\tau_1$ and $\tau_2$ calculated focusing on movement of electric charges during the dead time, thereby realizing zero volt transition (ZVT).

(3) Further, in the transformer described in the above (2), the control section preferably terminates the dead time $\tau$ before the electric charges that have moved to the floating capacitances return to the inductors.

When the electric charges that have moved to the floating capacitances return, switching voltage increases again. However, by terminating the dead time $\tau$ before the returning of the electric charges, the switching voltage can be prevented from increasing again.

(4) Further, in the transformer as described in the above (3), assuming that a switching cycle of the switches is T, an inductance of the inductors is L, and a resistance value of the load is $R_3$, the dead time $\tau$ satisfies the following relationship:

$$\tau_1+\tau_2 \leq \tau \leq \tau_0+(\tau_2/2)+\tau_1$$

where $$\tau_0 = \frac{T}{4} - \frac{L}{2R_3}$$

$$\tau_1 = \frac{T}{2} + \frac{L}{R_3} - \frac{1}{2}\sqrt{\left(T+\frac{2L}{R_3}\right)^2 - 32L\sum_{n=1}^{n} C_{nDS}}$$

$$\tau_2 = \frac{T}{2} - \frac{L}{R_3} - \frac{1}{2}\sqrt{\left(T+\frac{2L}{R_3}\right)^2 - 32L\sum_{n=1}^{n} C_{nDS}}$$

where n denotes the number of floating capacitances $C_{DS}$, $C_{nDS}$ denotes an n-th floating capacitance, a sign of a value in each radical sign is plus, and $\tau_1<\tau_2$ is satisfied.

In this case, an optimum range of the dead time $\tau$ can be precisely determined, thereby reliably realizing zero voltage transition.

(5) Depending on the topology of the rear stage circuit, the following configuration may be taken instead of the above (4).

Assuming that a switching cycle of the switches is T, an inductance, of the inductances of the inductors, that is dominant for the dead time is $L_1$, and a resistance value of the load is $R_3$, the dead time $\tau$ satisfies the following relationship:

$$\tau_1+\tau_2 \leq \tau \leq \tau_0+\tau_1$$

where $$\tau_0 = \frac{T}{4} - \frac{L_1}{4R_3}$$

$$\tau_1 = \frac{T}{4} + \frac{L_1}{4R_3} - \frac{1}{4}\sqrt{\left(T+\frac{L_1}{R_3}\right)^2 - 32L_1\sum_{n=1}^{n} C_{nDS}}$$

$$\tau_2 = \frac{T}{4} - \frac{L_1}{4R_3} - \frac{1}{4}\sqrt{\left(T-\frac{L_1}{R_3}\right)^2 - 32L_1\sum_{n=1}^{n} C_{nDS}}$$

where n denotes the number of floating capacitances $C_{DS}$, $C_{nDS}$ denotes an n-th floating capacitance, a sign of a value in each radical sign is plus, and $\tau_1<\tau_2$ is satisfied.

[Details Of Embodiments]

Hereinafter, an embodiment will be described in detail with reference to the drawings.

<<Example of Fundamental Circuit>>

FIG. 1 is a circuit diagram showing a transformer 1 as a basic form of a transformer according to the present embodiment. In FIG. 1, the transformer 1 is provided between an AC power supply 2 and a load R (R also denotes a resistance value). The transformer 1 includes a pair of capacitors C1 and C2, a pair of inductors L1 and L2, four switches $S_{r1}$, $S_{r2}$, $S_{b1}$, and $S_{b2}$, and a control section 3 which performs ON/OFF control of the switches $S_{r1}$, $S_{r2}$, $S_{b1}$, and $S_{b2}$. A switching frequency of the control section 3 is, for example, about 1 MHz.

The pair of capacitors C1 and C2 may have the same capacitance value, or may have different capacitance values. The same applies to the inductance values of the pair of inductors L1 and L2.

The switches $S_{r1}$, $S_{r2}$, $S_{b1}$, and $S_{b2}$ and the control section 3 form a switch device 4 which switches the state of circuit connection of the transformer 1. The switches $S_{r1}$ and $S_{r2}$ operate in synchronization with each other, and the switches $S_{b1}$ and $S_{b2}$ operate in synchronization with each other. The pair of switches $S_{r1}$ and $S_{r2}$ and the pair of switches $S_{b1}$ and $S_{b2}$ operate so as to be alternately turned ON exclusively from each other. The switches $S_{r1}$, $S_{r2}$, $S_{b1}$, and $S_{b2}$ are semiconductor switching elements formed by an SiC element or a GaN element, for example. The SiC element or the GaN element allows faster switching than an Si element, for example. In addition, sufficient withstand voltage (which can be even 6 kV per element, for example) can be obtained without connecting multiple stages of such elements.

In FIG. 1, the pair of capacitors C1 and C2 are connected in series to each other via a connection point M1. The AC power supply 2 is connected between both ends of this series unit. Input voltage $v_{in}$ is applied to the series unit of the pair of capacitors C1 and C2, so that input current $i_{in}$ flows.

The pair of inductors L1 and L2 are connected in series to each other via a connection point M2. Between both ends of this series unit, input voltage $v_m$ is applied via the capacitors C1 and C2, so that current $i_m$ flows. When one of the switches $S_{r2}$ and $S_{b2}$ is ON, current flows in the load R. Here, voltage applied to the load R is $v_{out}$, and output current flowing from the transformer 1 to the load R is $i_{out}$.

Figure 2:
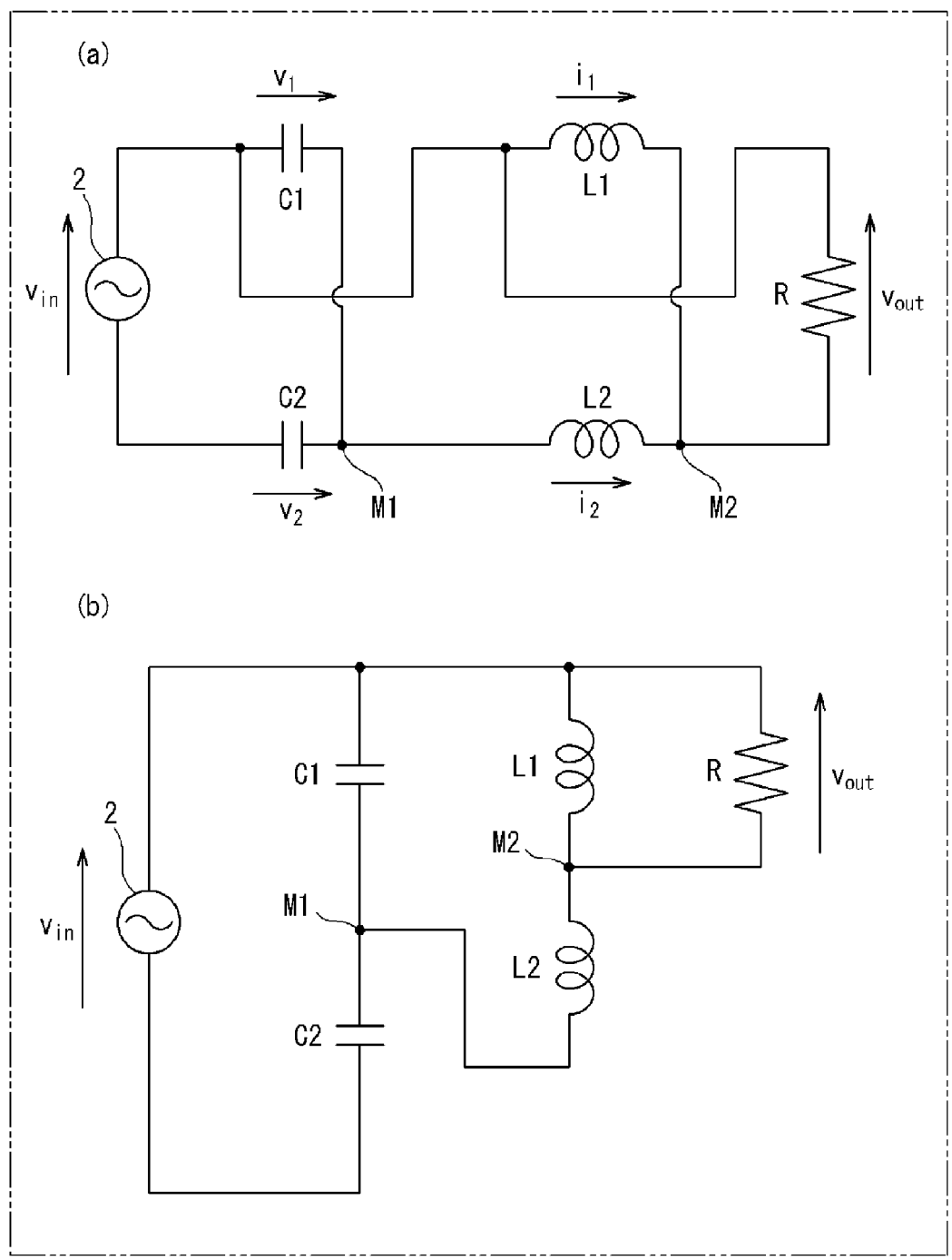
FIG. 2 is a circuit diagram in which (a) shows a substantial connection state when, of four switches shown in FIG. 1, two switches on the upper side are ON and two switches on the lower side are OFF, and (b) shows, in a step-like shape, the same circuit diagram as in (a).

In FIG. 2, (a) is a circuit diagram showing a substantial connection state when, among the four switches $S_{r1}$, $S_{r2}$, $S_{b1}$, and $S_{b2}$ in FIG. 1, the two switches $S_{r1}$ and $S_{r2}$ on the upper side are ON, and the two switches $S_{b1}$ and $S_{b2}$ on the lower side are OFF. In the drawing, the switch device 4 in FIG. 1 is not shown. In FIG. 2, (b) is a circuit diagram showing, in a step-like shape, the same circuit diagram as in (a).

Figure 3:
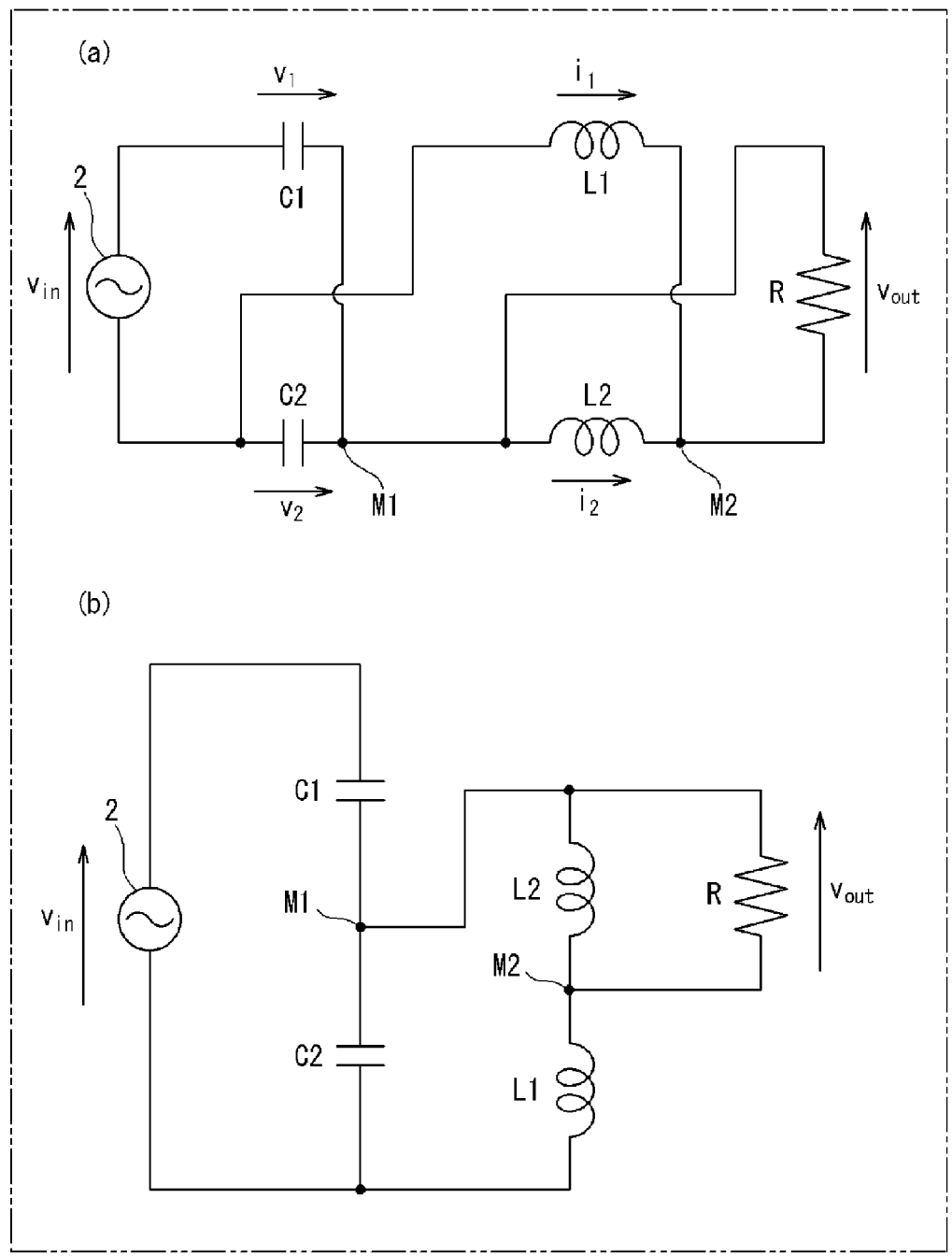
FIG. 3 is a circuit diagram in which (a) shows a substantial connection state when, of four switches shown in FIG. 1, two switches on the lower side are ON and two switches on the upper side are OFF, and (b) shows, in a step-like shape, the same circuit diagram as in (a).

On the other hand, in FIG. 3, (a) is a circuit diagram showing a substantial connection state when, among the four switches $S_{r1}$, $S_{r2}$, $S_{b1}$, and $S_{b2}$, the two switches $S_{b1}$ and $S_{b2}$ on the lower side are ON, and the two switches $S_{r1}$ and $S_{r2}$ on the upper side are OFF. In FIG. 3, (b) is a circuit diagram showing, in a step-like shape, the same circuit diagram as in (a).

While the states shown in FIG. 2 and FIG. 3 are alternately repeated, voltage obtained via the connection point M1 of the series unit of the capacitors C1 and C2 becomes voltage obtained via the connection point M2 of the series unit of the inductors L1 and L2. That is, the circuit configuration is composed of a front stage circuit including the pair of capacitors C1 and C2, and a rear stage circuit including the pair of inductors L1 and L2, and at each stage, the polarity of output relative to input is inverted through switching. Regarding the capacitors C1 and C2, the directions of currents thereof are alternately inverted through switching. Regarding the inductors L1 and L2, the directions of voltages thereof are alternately inverted through switching.

Here, it can be estimated that the input voltage becomes ¼ when outputted. This will be logically proved below.

In FIG. 2, $v_{in}$ is input voltage from the AC power supply 2, $v_{out}$ is voltage applied to the load R, $v_1$ is voltage applied to the capacitor C1, $v_2$ is voltage applied to the capacitor C2, $i_1$ is current flowing through the inductor L1, and $i_2$ is current flowing through the inductor L2. In this case, the following expressions are satisfied.

For simplifying calculation, it is assumed that the capacitors C1 and C2 have the same capacitance value C, and the inductors L1 and L2 have the same inductance value L.

$$-v_{in} = v_1 - v_2$$

$$-\frac{v_{out}}{R} = i_1 + i_2$$

$$C\frac{d}{dt}(v_1 + v_2) = -i_2$$

$$L\frac{d}{dt} = (i_1 - i_2) = -v_1$$

$$v_{out} = L\frac{d}{dt}i_1$$

The above expressions are converted into expressions of $v_1$, $i_1$, and $i_2$, as follows.

$$L\frac{d}{dt}i_1 = -R(i_1 + i_2)$$

$$L\frac{d}{dt}i_2 = v_1 - R(i_1 + i_2)$$

$$2C\frac{d}{dt}v_1 = -i_2 - C\frac{d}{dt}v_{in}$$

Here, if $Ri_1 = v_3$ and $Ri_2 = v_4$ are set, the following equation 1 is obtained.

$$\frac{d}{dt}v_3 = -\frac{R}{L}(v_3 + v_4) \quad \text{(Equation 1)}$$

$$\frac{d}{dt}v_4 = \frac{R}{L}(v_1 - v_3 - v_4)$$

$$\frac{d}{dt}v_1 = -\frac{1}{2CR}v_4 - \frac{1}{2}\frac{d}{dt}v_{in}$$

In FIG. 3, as in FIG. 2, $v_{in}$ is input voltage from the AC power supply 2, $v_{out}$ is voltage applied to the load R, $v_1$ is voltage applied to the capacitor C1, $v_2$ is voltage applied to the capacitor C2, $i_1$ is current flowing through the inductor L1, and $i_2$ is current flowing through the inductor L2. In this case, the following expressions are satisfied.

$$-v_{in} = v_1 - v_2$$

$$-\frac{v_{out}}{R} = i_1 + i_2$$

$$C\frac{d}{dt}(v_1 + v_2) = i_1$$

$$L\frac{d}{dt} = (i_1 - i_2) = -v_2$$

$$v_{out} = L\frac{d}{dt}i_2$$

The above expressions are converted into expressions of $v_1$, $i_1$, and $i_2$, as follows.

$$L\frac{d}{dt}i_2 = -R(i_1 + i_2)$$

$$L\frac{d}{dt}i_1 = -v_1 - v_{in} - R(i_1 + i_2)$$

$$2C\frac{d}{dt}v_1 = i_1 - C\frac{d}{dt}v_{in}$$

Here, if $Ri_1 = v_3$ and $Ri_2 = v_4$ are set, the following equation 2 is obtained.

$$\frac{d}{dt}v_4 = -\frac{R}{L}(v_3 + v_4) \quad \text{(Equation 2)}$$

$$\frac{d}{dt}v_3 = -\frac{R}{L}(v_1 + v_3 + v_4 + v_{in})$$

$$\frac{d}{dt}v_1 = \frac{1}{2CR}v_3 - \frac{1}{2}\frac{d}{dt}v_{in}$$

Here, it is difficult to derive an exact solution from the above two states. Therefore, the following conditions are set within a range that is considered to cause no practical problem.

(1) At a frequency $f_o$ of input voltage, the impedance (reactance) of L is sufficiently smaller than the resistance value. That is, $2\pi f_o L \ll R$ is satisfied. Preferably, a difference represented by the inequality sign is, for example, one-digit difference or greater, or more preferably, two-digit difference or greater. Thus, more stable transformation operation with less distortion can be obtained.

(2) At the switching frequency fs, the impedance (reactance) of C is sufficiently smaller than the resistance value R, but at the frequency $f_o$ of input voltage, the impedance (reactance) of C is sufficiently greater than the resistance value. That is, $1/(2\pi f_s C) \ll R \ll 1/(2\pi f_o C)$ is satisfied. Preferably, a difference represented by the inequality sign is, for example, one-digit difference or greater, or more preferably, two-digit difference or greater. Thus, more stable transformation operation with less distortion can be obtained.

(3) In one cycle of switching, input voltage hardly varies. Therefore, $v_{in}(t+\Delta t) \approx v_{in}(t)$ ($0 \leq \Delta t \leq 1/fs$)

(4) The system is steady, and returns to the same state with a period (1/fs).
Therefore, $v_x(t+(1/fs)) \approx v_x(t)$ (x=1, 2, 3, 4)

If the switches $S_{r1}$ and $S_{r2}$ become ON during a period of $0 \leq t \leq (1/2fs)$ and the switches $S_{b1}$ and $S_{b2}$ become ON during a period of $(1/2fs) \leq t \leq (1/fs)$, the following equation 3 is obtained by primary approximation of equation 1 about t=0. In addition, the following equation 4 is obtained by primary approximation of equation 2 about t=(1/2 fs).

$$v_3\left(\frac{1}{2f_s}\right) \approx v_3(0) - \frac{R}{2f_sL}\{v_3(0) + v_4(0)\} \quad \text{(Equation 3)}$$

$$v_4\left(\frac{1}{2f_s}\right) \approx v_4(0) + \frac{R}{2f_sL}\{v_1(0) - v_3(0) - v_4(0)\}$$

$$v_1\left(\frac{1}{2f_s}\right) \approx v_1(0) - \frac{1}{4f_sCR}v_4(0) - \frac{1}{2}\left\{v_{in}\left(\frac{1}{2f_s}\right) - v_{in}(0)\right\}$$

In the above equation 3, the third term on the right-hand side of the expression at the third stage, i.e., $-(1/2)\{v_{in}(1/2 fs)-v_{in}(0)\}$ is sufficiently close to zero.

$$v_4\left(\frac{1}{f_s}\right) \approx v_4\left(\frac{1}{2f_s}\right) - \frac{R}{2f_sL}\left\{v_3\left(\frac{1}{2f_s}\right) + v_4\left(\frac{1}{2f_s}\right)\right\} \quad \text{(Equation 4)}$$

$$v_3\left(\frac{1}{f_s}\right) \approx v_3\left(\frac{1}{2f_s}\right) - \frac{R}{2f_sL}\{v_1\left(\frac{1}{2f_s}\right) +$$
$$v_3\left(\frac{1}{2f_s}\right) + v_4\left(\frac{1}{2f_s}\right) + v_{in}\left(\frac{1}{2f_s}\right)\}$$

$$v_1\left(\frac{1}{f_s}\right) \approx v_1\left(\frac{1}{2f_s}\right) + \frac{1}{4f_sCR}v_3\left(\frac{1}{2f_s}\right) - \frac{1}{2}\left\{v_{in}\left(\frac{1}{f_s}\right) - v_{in}\left(\frac{1}{2f_s}\right)\right\}$$

In the above equation 4, the third term on the right-hand side of the expression at the third stage, i.e., $-(1/2)\{v_{in}(1/fs)=v_{in}(1/2 fs)\}$ is sufficiently close to zero.

Here, if $v_1$, $v_3$, and $v_4$ in equations 3 and 4 are each linked, that is, $v_1(0)=v_1(1/fs)$, $v_3(0)=v_3(1/fs)$, and $v_4(0)=v_4 (1/fs)$ are used, and in addition, if $\Delta T=1/(2 fs)$ is set, the following expressions are satisfied.

$-v_3(0)-v_4(0) \approx v_1(\Delta T)+v_3(\Delta T)+v_4(\Delta T)+v_{in}(\Delta T)$ $v_1(0)-v_3(0)-v_4(0) \approx v_3(\Delta T)+v_4(\Delta T)$ $v_4(0) \approx v_3(\Delta T)$ If a sum of the expressions at the first and second stages shown above (just above) is taken, the following expression is obtained.

$v_{in} = -2\{v_3(0)+v_4(0)+v_3(\Delta T)+v_4(\Delta T)\}+v_1(0)-v_1(\Delta T)$

Here, from the expression at the third stage in equation 3, $v_1(0)-v_1(\Delta T)=(1/(4 fsCR))v_4(0)$ is obtained.

In addition, $-v_{out}=R(i_1+i_2)=v_3+v_4$ is obtained, and this expression is always satisfied. Therefore, the following conclusive expression is obtained.

$$v_{in}(\Delta T) \approx 4v_{out}(\Delta T) + \frac{1}{4f_sCR}v_4(0)$$

Here, for simplification, it has been assumed that the values C are the same value and the values L are the same value. However, even if these values are different values, the same result can be derived through similar expression development.

In the conclusive expression, the second term on the right-hand side of the expression at the lowermost stage is sufficiently smaller than the first term, and thus can be neglected. Therefore, $v_{in} \approx 4v_{out}$ is satisfied regardless of load variation (variation in the value of R), and output voltage becomes about ¼ of input voltage. Since no loss occurs except for the load R, output current is about four times as great as input current, and input impedance is sixteen times as great as the resistance value R.

As a circuit parameter condition, regarding inductance, $2\pi f_o L \ll R$ is satisfied. In addition, regarding capacitance, $1/(2\pi f_s C) \ll R \ll 1/(2\pi f_o C)$ is satisfied. If this circuit parameter condition is satisfied, it is reliably realized that the voltage transformation ratio is constant regardless of load variation, and more stable transformation operation with less distortion is obtained. Preferably, a difference represented by the inequality sign is, for example, one-digit difference or greater, or more preferably, two-digit difference or greater.

Figure 4:
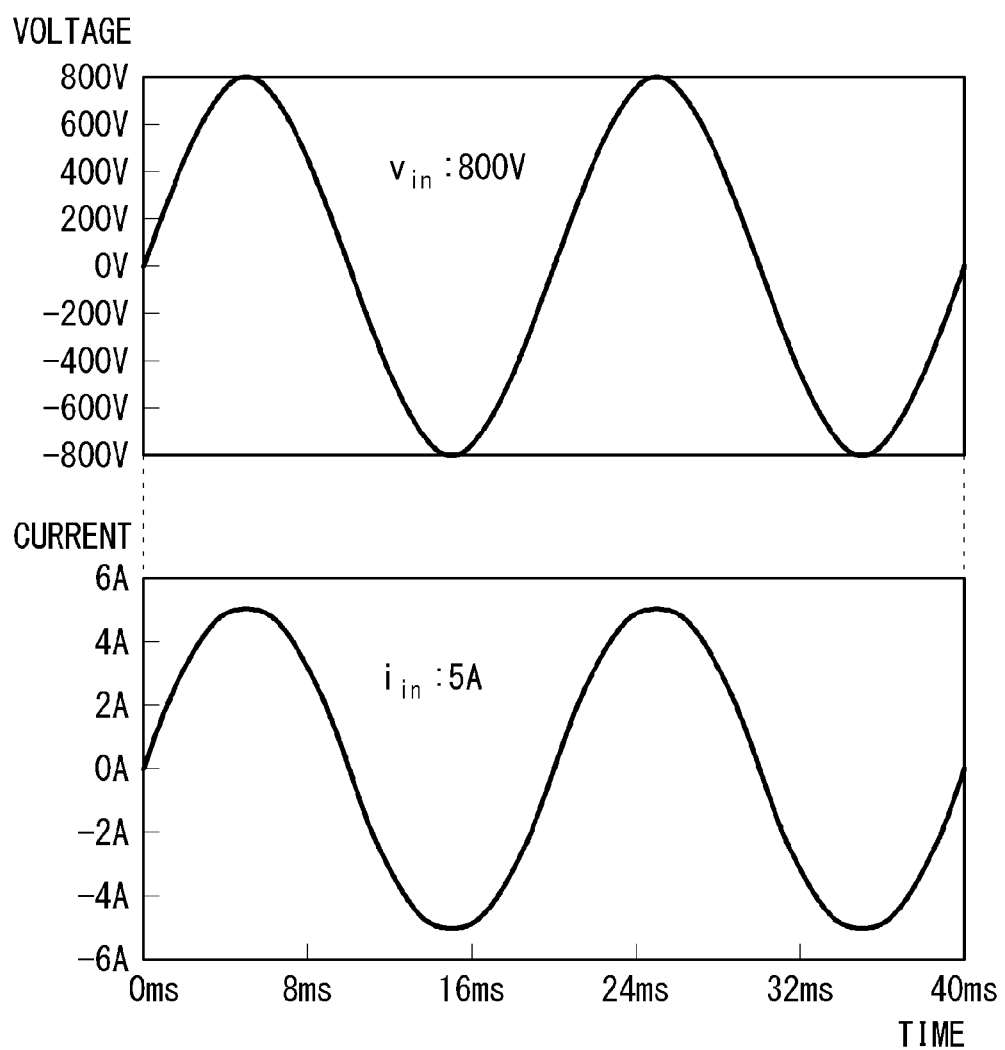
FIG. 4 is a waveform diagram in which an upper graph shows input voltage to the transformer and a lower graph shows input current to the transformer.

FIG. 4 is a waveform diagram in which an upper graph shows input voltage to the transformer 1 and a lower graph shows input current to the transformer 1.

Figure 5:
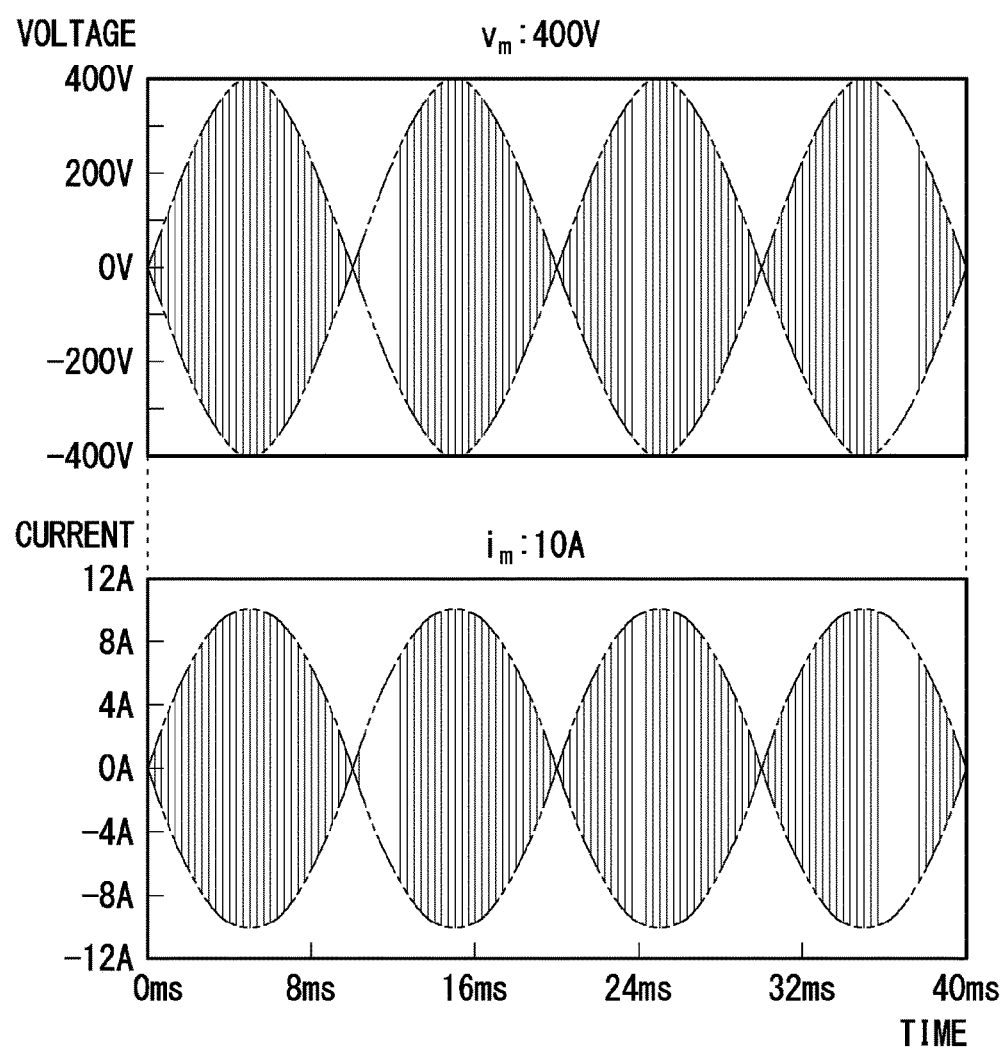
FIG. 5 is a waveform diagram showing voltage $v_m$ and current $i_m$ at an intermediate stage of transformation.

FIG. 5 is a waveform diagram showing voltage $v_m$ and current $i_m$ at an intermediate stage of transformation. Actually, these are composed of pulse trains based on switching, and as a whole, have such waveforms as shown in FIG. 5.

Figure 6:
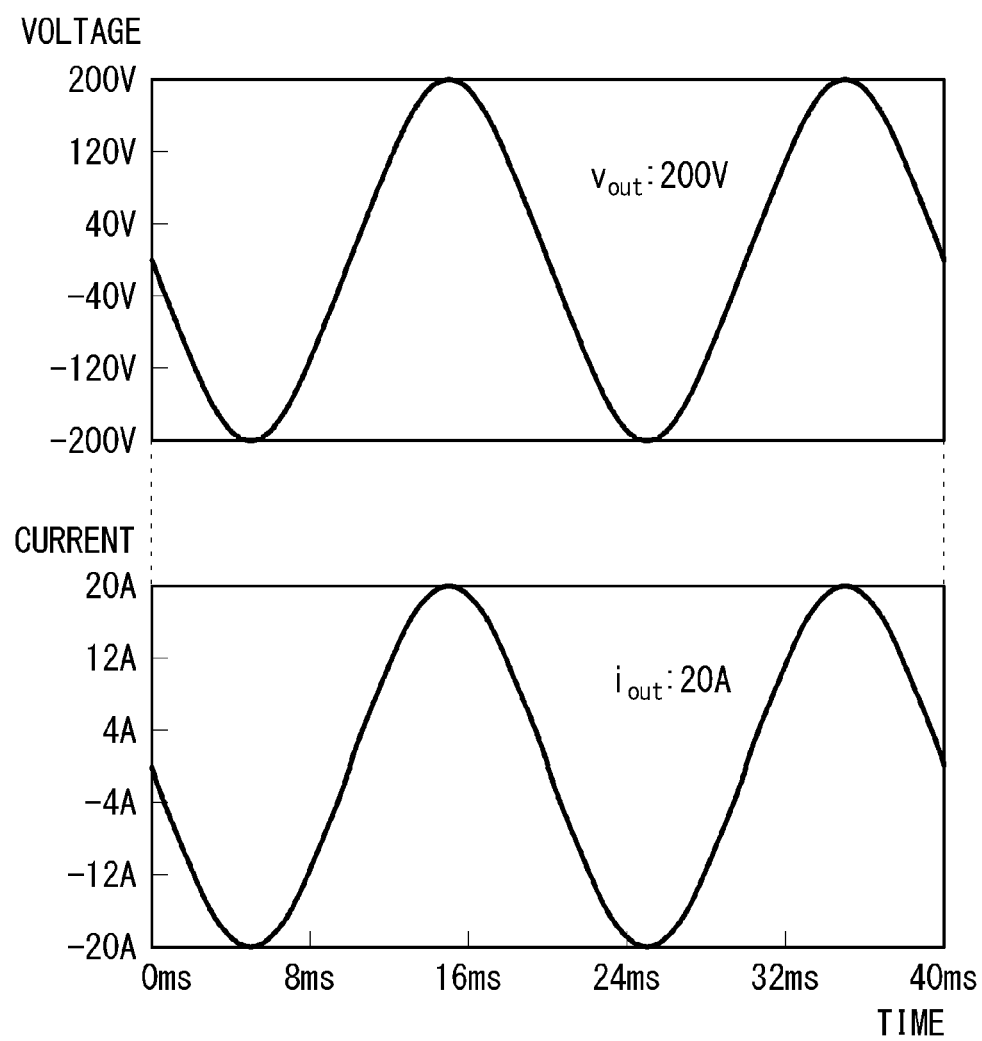
FIG. 6 is a waveform diagram in which an upper graph shows output voltage from the transformer and a lower graph shows output current from the transformer.

FIG. 6 is a waveform diagram in which an upper graph shows output voltage from the transformer 1 and a lower graph shows output current from the transformer 1. As is obvious from comparison between FIG. 4 and FIG. 6, voltage is transformed to be ¼, and along with this, current is quadrupled.

The transformer 1 shown in FIG. 1 is composed of a front stage circuit 1f including the switches $S_{r1}$ and $S_{b1}$ and the capacitors C1 and C2, and a rear stage circuit 1r including the switches $S_{r2}$ and $S_{b2}$ and the inductors L1 and L2. The circuit configurations of the front stage circuit 1f and the rear stage circuit 1r can be topologically expressed as follows.

That is, the front stage circuit 1f includes a "switch series unit" and "capacitors" described below.

The "switch series unit" is composed of two switches ($S_{r1}$ and $S_{b1}$) connected in series to each other. The odd-numbered switch ($S_{r1}$) and the even-numbered switch ($S_{b1}$), as seen from one end (e.g., an upper end) of both ends of the series unit, are configured to be alternately turned ON, and the switch series unit as a whole is connected in parallel to the power supply 2.

When a mutual connection point (N2) of the respective switches and points (N1 and N3) at the both ends of the switch series unit are regarded as three nodes in total and these three nodes are seen in order of 1 to 3 from one of the both ends of the switch series unit, the "capacitors (C1 and C2)" are disposed on at least one electrical path of a first electrical path and a second electrical path. The first electrical path combines the odd nodes (N1 and N3) and leads the odd nodes to a first output port Px, while the second electrical path leads the even node (N2) to a second output port Py. The "capacitors (C1 and C2)" are present so as to correspond to two nodes.

The rear stage circuit 1r includes an "element series unit" and "inductors" described below.

The "element series unit" is composed of a pair of semiconductor elements ($S_{r2}$ and $S_{b2}$) that are connected in series to each other and perform conducting operations of mutually opposite polarities, and one of both ends of the series unit is connected to the first output port Px while the other end thereof is connected to the second output port Py.

The "inductors (L1 and L2)" are disposed on at least one electrical path of a third electrical path and a fourth electrical path. The third electrical path combines two nodes (N11 and N13) that are points at the both ends of the element series unit, and leads the nodes to one of both ends of the load R. The fourth electrical path leads one node (N12) that is a mutual connection point of the pair of semiconductor elements to the other end of the load R. The "inductors (L1 and L2)" are present so as to correspond to two nodes (N11 and N13) among the three nodes in total.

<<Practical transformer>>

Next, an example of a transformer obtained by practically developing the above-described basic circuit will be described on the basis of the basic circuit.

Figure 7:
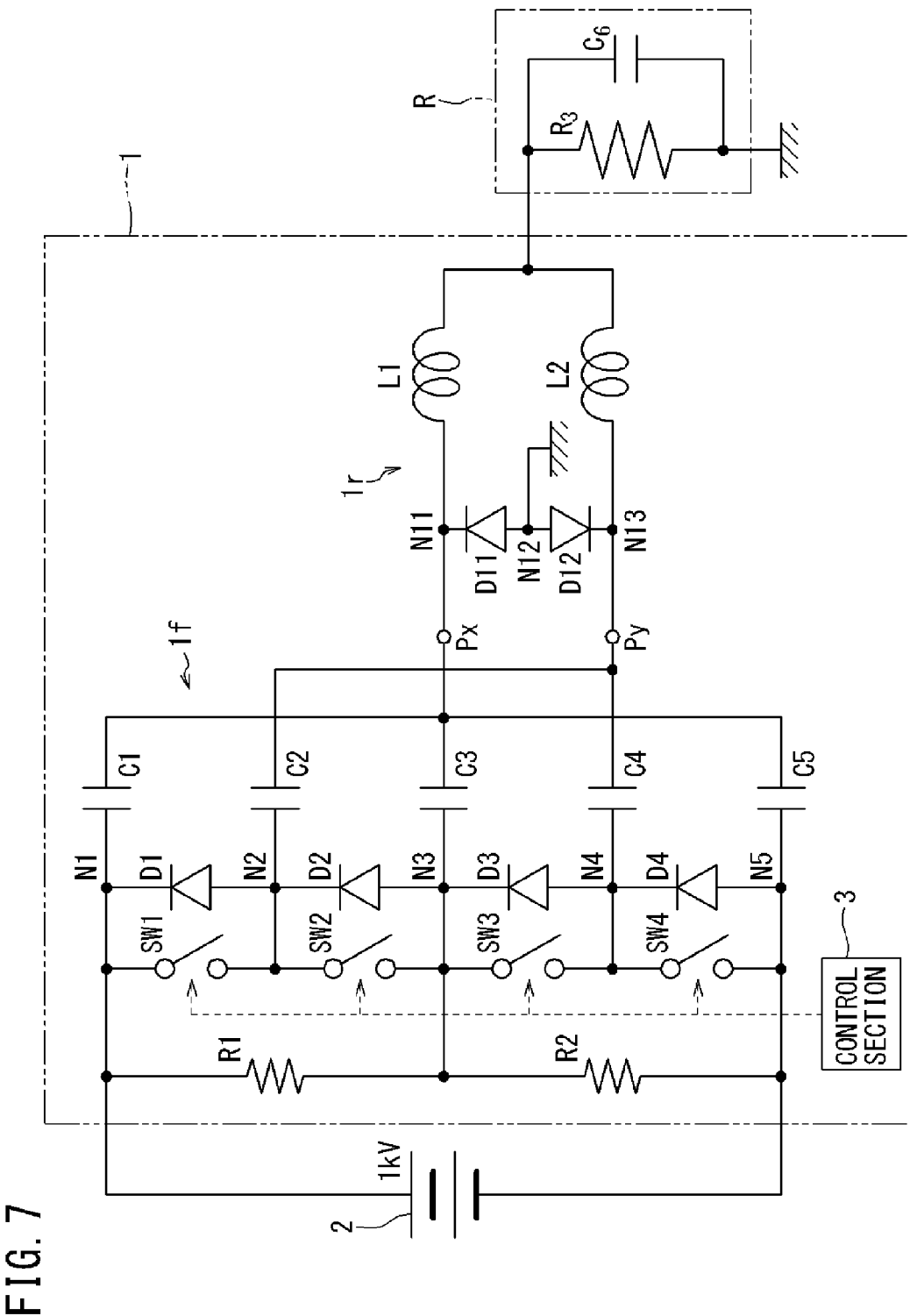
FIG. 7 is a circuit diagram showing an example of a transformer that is developed to be more practical.

FIG. 7 is a circuit diagram of such a transformer 1. This transformer 1 is provided between a power supply 2 and a load R, and is composed of a front stage circuit 1f, a rear stage circuit 1r, and a control section 3. For example, the power supply 2 is a DC power supply, and voltage is 1 kV. The load R includes a resistance $R_3$ and a capacitance $C_6$ as equivalent circuit elements.

The front stage circuit 1f includes bleeder resistor $R_1$ and $R_2$, switches SW1 to SW4, diodes D1 to D4 intrinsic to the switches SW1 to SW4, and capacitors C1 to C5, and these elements are connected as shown in FIG. 7.

The rear stage circuit 1r includes diodes D11 and D12 and inductors L1 and L2, and these elements are connected as shown in FIG. 7.

In addition, a control section 3 which performs ON/OFF control of the switches SW1 to SW4 is provided.

While five capacitors C1 to C5 are shown in FIG. 7, one of these capacitors can be omitted as described later. Therefore, using "4" equal to the number of the switches, the circuit shown in FIG. 7 is referred to as a "4C2L" circuit having 4C at the front stage and 2L at the rear stage. In contrast, the circuit shown in FIG. 1 is "2C2L".

The diodes D1 to D4 may be body diodes intrinsic to the switches SW1 to SW4, or may be external diodes provided separately from the switches SW1 to SW4 depending on the type of the switches SW1 to SW4. These diodes D1 to D4 function as freewheel diodes, and may reduce switching loss, and further, may eventually reduce inductances of the inductors L1 and L2 and thus contribute to downsizing.

When the circuit configuration of the transformer 1 shown in FIG. 7 is topologically expressed similarly to FIG. 1, the transformer 1 includes, as the front stage circuit 1f, a "switch series unit" and "capacitors (C1 to C5)".

The "switch series unit" is composed of the switches (SW1 to SW4) connected in series to each other. The odd-numbered switches (SW1 and SW3) and the even-numbered switches (SW2 and SW4), as seen from one end (e.g., an upper end) of both ends of the series unit, are alternately turned ON, and the switch series unit as a whole are connected in parallel to the power supply 2.

When mutual connection points (N2, N3, and N4) of the respective switches and points (N1 and N5) at the both ends of the switch series unit are regarded as five nodes in total and these five nodes are seen in order of 1 to 5 from one of the both ends of the switch series unit, the "capacitors (C1 to C5)" are disposed on at least one electrical path of a first electrical path and a second electrical path. The first electrical path combines the odd nodes (N1, N3, and N5) and leads the odd nodes to a first output port Px, and the second electrical path combines the even nodes (N2 and N4) and leads the even nodes to a second output port Py. The "capacitors (C1 to C5)" are present so as to correspond to five nodes.

In addition, the transformer 1 includes, as the rear stage circuit 1r, an "element series unit" and "inductors (L1 and L2)".

The "element series unit" is composed of a pair of semiconductor elements (D11 and D12) that are connected in series to each other, and perform conducting operations of mutually opposite polarities, and one of both ends of the series unit is connected to the first output port Px while the other end thereof is connected to the second output port Py.

The "inductors (L1 and L2)" are disposed on at least one electrical path of a third electrical path and a fourth electrical path. The third electrical path combines two nodes (N11 and N13) that are points at the both ends of the element series unit, and leads the two nodes to one of both ends of the load R. The fourth electrical path leads one node (N12) that is a mutual connection point of the pair of semiconductor elements to the other end of the load R. The "inductors (L1 and L2)" are present so as to correspond to two nodes (N11 and N13) among the three nodes in total.

It was confirmed that the transformer shown in FIG. 7 performs switching so that the switches SW1 and SW3 and the switches SW2 and SW4 are alternately turned ON under the same conditions as those for the transformer 1 shown in FIG. 1, and thus the transformer operates as a step-down circuit having a voltage transformation ratio of 1/8. That is, input voltage of 1 kV can be stepped down to DC voltage of 125 V.

<<Topological variations>>

Next, topological variations of the circuit configuration of the transformer 1 (FIG. 1, FIG. 7, etc.) will be described.

(Topology of 2C Front Stage Circuit)

Figure 8:
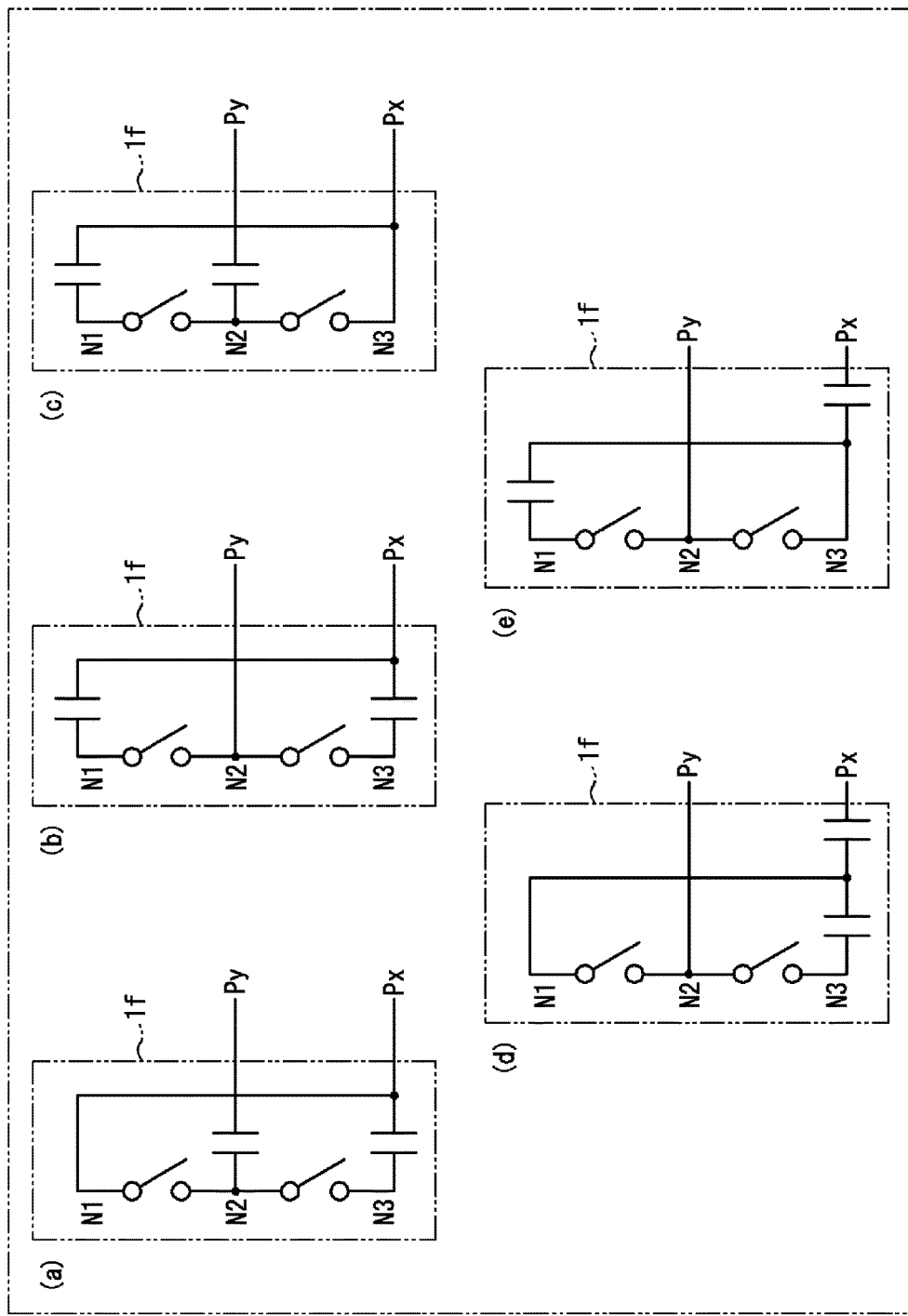
FIG. 8 is a circuit diagram showing topological variations of a main part of a front stage circuit in a "2C2L" transformer.
Figure 9:
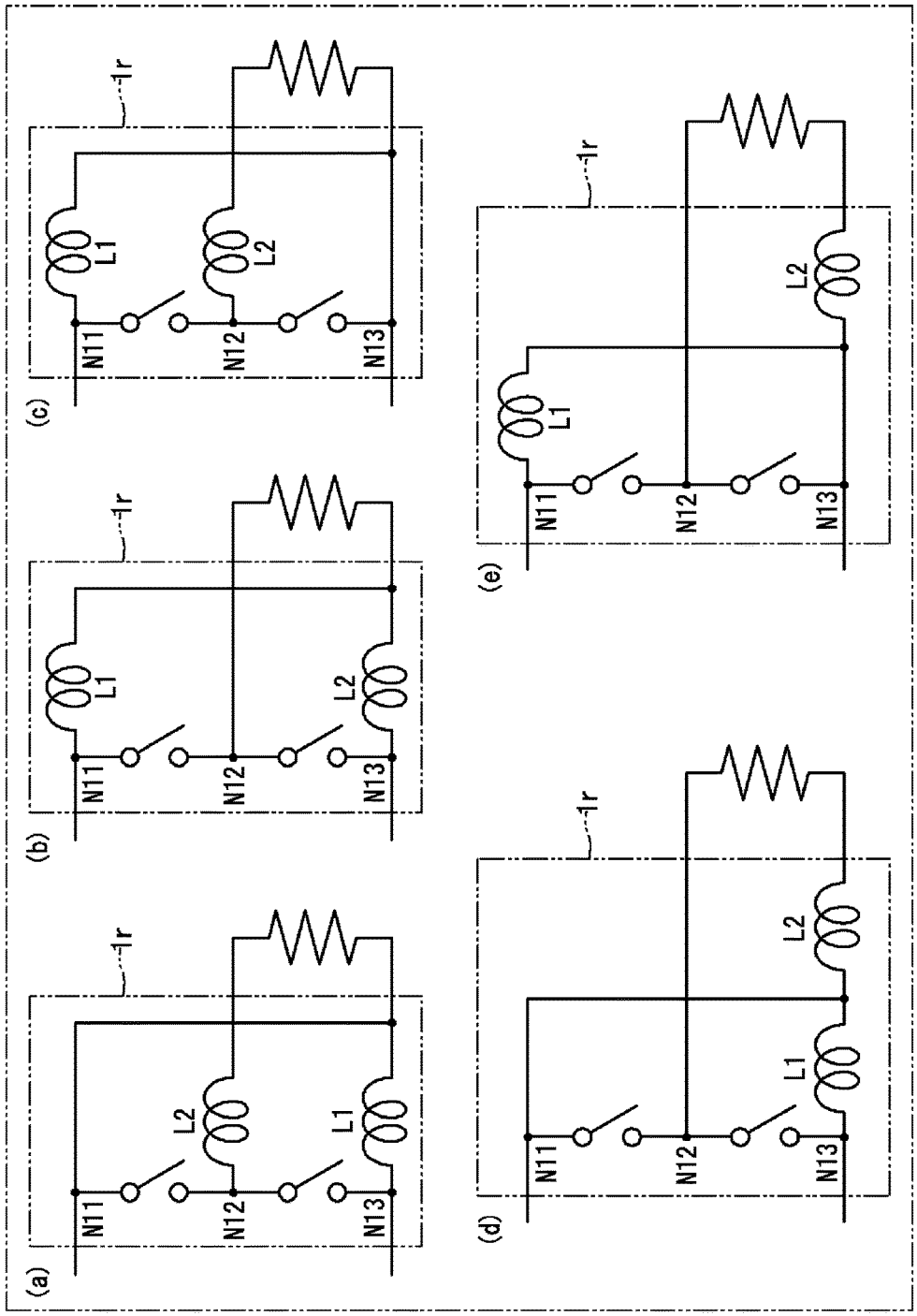
FIG. 9 is a circuit diagram showing topological variations of a main part of a rear stage circuit.

FIG. 8 is a circuit diagram showing topological variations of a main part of the front stage circuit 1f in the "2C2L" transformer 1. Circuits shown in (a) to (e) of FIG. 9 are each composed of a pair of switches and a pair of capacitors (reference numerals thereof are omitted).

In (a) of FIG. 8, capacitors are present so as to correspond to the node N3 of the switch series unit and the node N2 at the mutual connection point of the pair of switches. In (b) of FIG. 8, the topology of FIG. 1 is shown. In (c) of FIG. 8, capacitors are present so as to correspond to the node N1 of the switch series unit and the node N2 at the mutual connection point of the pair of switches. In (d) of FIG. 8, two capacitors are present so as to correspond to the node N3 of the switch series unit, and one capacitor is present in the output direction so as to correspond to the node N1. In (e) of FIG. 8, two capacitors are present so as to correspond to the node N1 of the switch series unit, and one capacitor is present in the output direction so as to correspond to the node N3.

Although two capacitors are present in any of the above circuits, capacitors may be present so as to correspond to all the nodes N1 to N3.

(Topology of 2L Rear Stage Circuit)

FIG. 9 is a circuit diagram showing topological variations of a main part of the rear stage circuit 1r. In each of circuits shown in (a) to (e) of FIG. 9, the rear stage circuit 1r connected to the load is composed of a pair of switches and a pair of inductors (reference numerals thereof are omitted). Instead of the switches, diodes may be used as shown in FIG. 7.

In (a) of FIG. 9, inductors are present so as to correspond to the node N13 of the switch series unit and the node N12 at the mutual connection point of the pair of switches. In (b) of FIG. 9, the topology of FIG. 1 is shown. In (c) of FIG. 9, inductors are present so as to correspond to the node N11 of the switch series unit and the node N12 at the mutual connection point of the pair of switches. In (d) of FIG. 9, two inductors are present so as to correspond to the node N13 of the switch series unit, and one inductor is present in the output direction so as to correspond to the node N11. In (e) of FIG. 9, two inductors are present so as to correspond to the node N11 of the switch series unit, and one inductor is present in the output direction so as to correspond to the node N13.

Although two inductors are present in any of the above circuits, inductors may be present so as to correspond to all the nodes N11 to N13.

In the case of (b) of FIG. 9, the inductances L (common inductance) of the two inductors L1 and L2 equally affect a dead time τ described later. On the other hand, in the cases of (a), (c), (d), and (e) of FIG. 9, the inductance $L_1$, of the inductances $L_1$ and $L_2$ of the two inductors L1 and L2, is dominant in setting of the dead time τ.

(Topology of 4C Front Stage Circuit)

Figure 10:
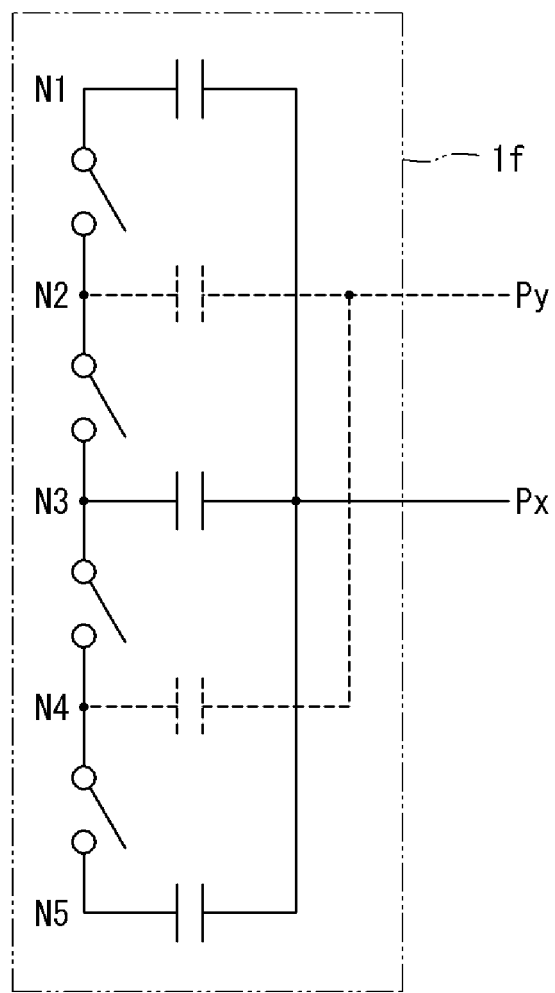
FIG. 10 is a diagram showing a main part of a front stage circuit in a "4C2L" transformer.

FIG. 10 shows the main part of the front stage circuit 1f in the "4C2L" transformer 1. In FIG. 10, a first electrical path that combines the odd nodes N1, N3, and N5 as seen from one of both ends of the switch series unit and leads the odd nodes to the first output port Px is represented by a solid line, and a second electrical path that combines the even nodes N2 and N4 and leads the even nodes to the second output port Py is represented by a dashed line. Expressing the second electrical path by the dashed line is simply for convenience of illustration, and the second electrical path coexists with the first electrical path.

This topology is identical to the front stage circuit 1f shown in FIG. 7.

In FIG. 10, one of the five capacitors may be omitted to provide "4C". Assuming that the number of nodes is m (=5), the number of corresponding capacitors needs to be at least four.

At least one capacitor needs to be interposed between nodes that are mutually combined and connected by the first electrical path (solid line) or the second electrical path (dashed line) among the five nodes N1 to N5, in order to realize insulation for DC therebetween.

Figure 11:
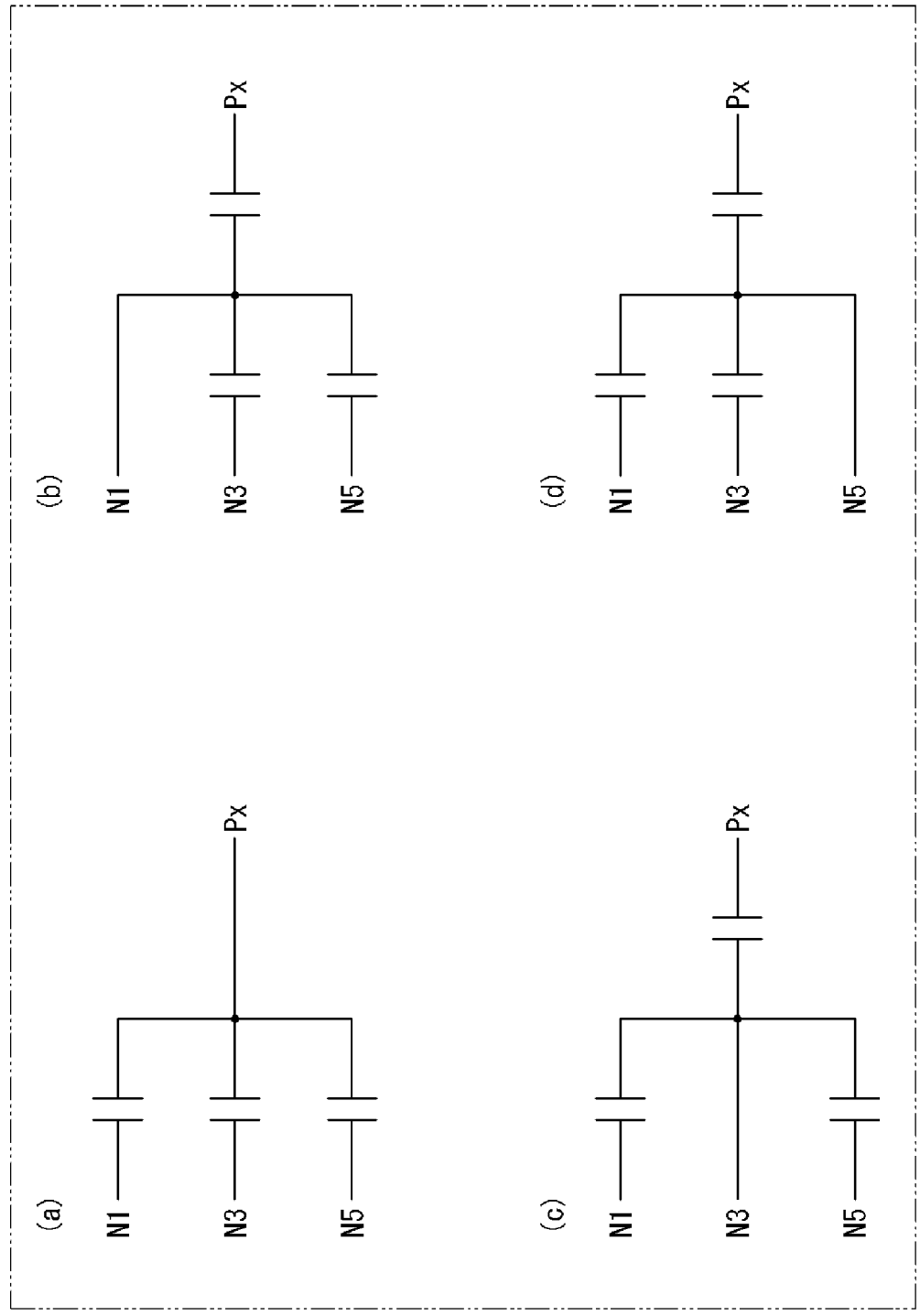
FIG. 11 is a diagram showing circuit variations of a first electrical path in a case where the total number of capacitors is not reduced in the first electrical path (solid line).
Figure 12:
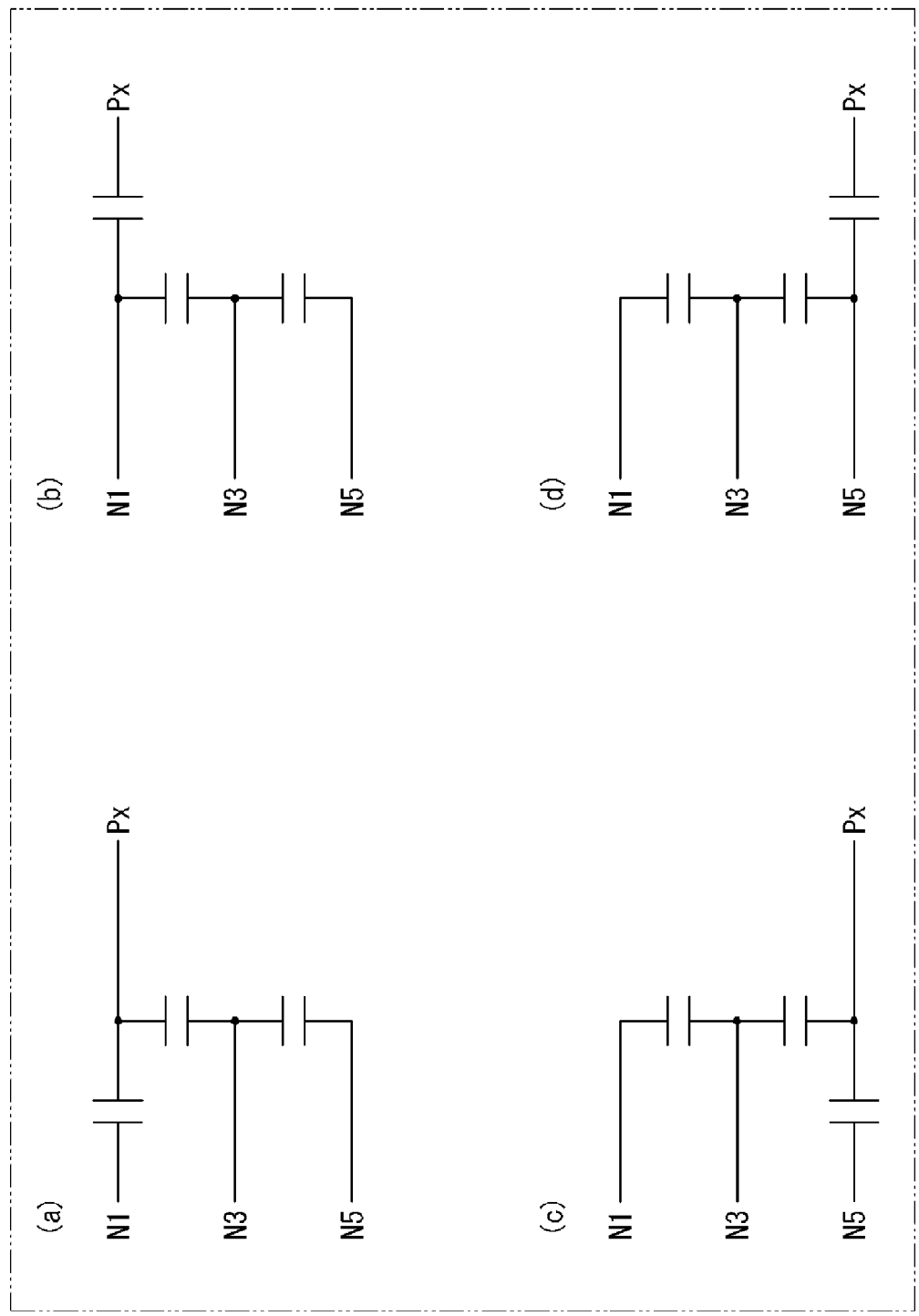
FIG. 12 is a diagram showing other circuit variations of the first electrical path in a case where the total number of capacitors is not reduced in the first electrical path (solid line).

FIG. 11 and FIG. 12 each show circuit variations of the first electrical path in the case where the total number of capacitors is not reduced in the first electrical path (solid line) shown in FIG. 10.

In the circuit shown in (a) of FIG. 11, three electrical paths before being combined into a single path are each provided with a capacitor (similar to FIG. 10). In the circuits shown in (b), (c), and (d) of FIG. 11, two of three electrical paths before being combined into a single path are each provided with a capacitor, and a single electrical path obtained by combining the three electrical paths is also provided with a capacitor.

In the circuits shown in (a), (b), (c), and (d) of FIG. 12, the electrical paths are combined in two stages, and capacitor(s) is/are provided before and/or after the electrical paths are combined.

Figure 13:
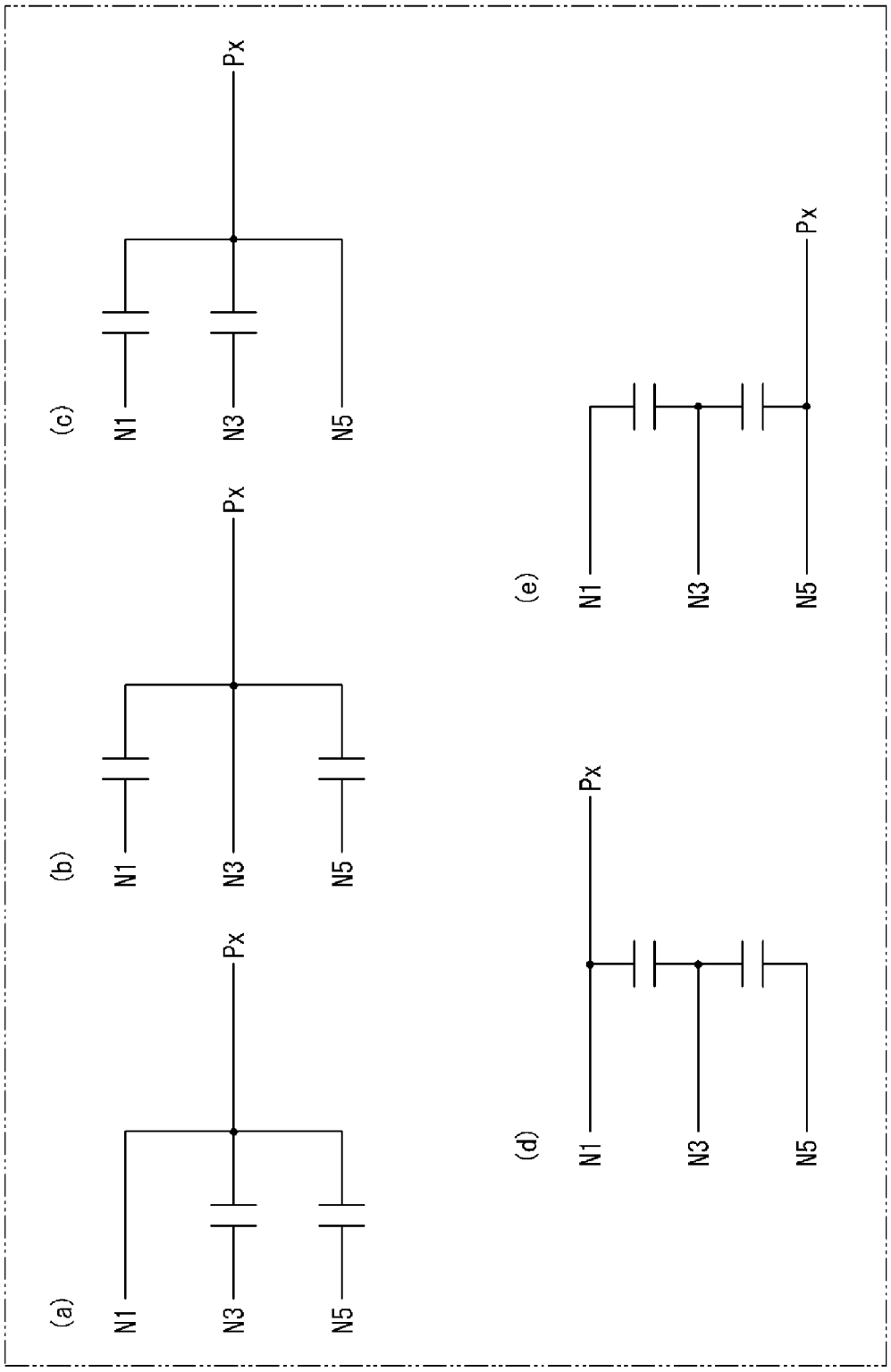
FIG. 13 is a diagram showing circuit variations of the first electrical path in a case where the total number of capacitors is reduced by one in the first electrical path (solid line) shown in FIG. 10.

FIG. 13 is a diagram showing circuit variations of the first electrical path in the case where the total number of capacitors is reduced by one in the first electrical path (solid line) shown in FIG. 10.

In the circuits shown in (a) to (e) of FIG. 13, one node among the nodes N1, N3, and N5 is directly connected to the first output port Px. The other nodes are each connected to the first output port Px via one capacitor or two capacitors.

Figure 14:
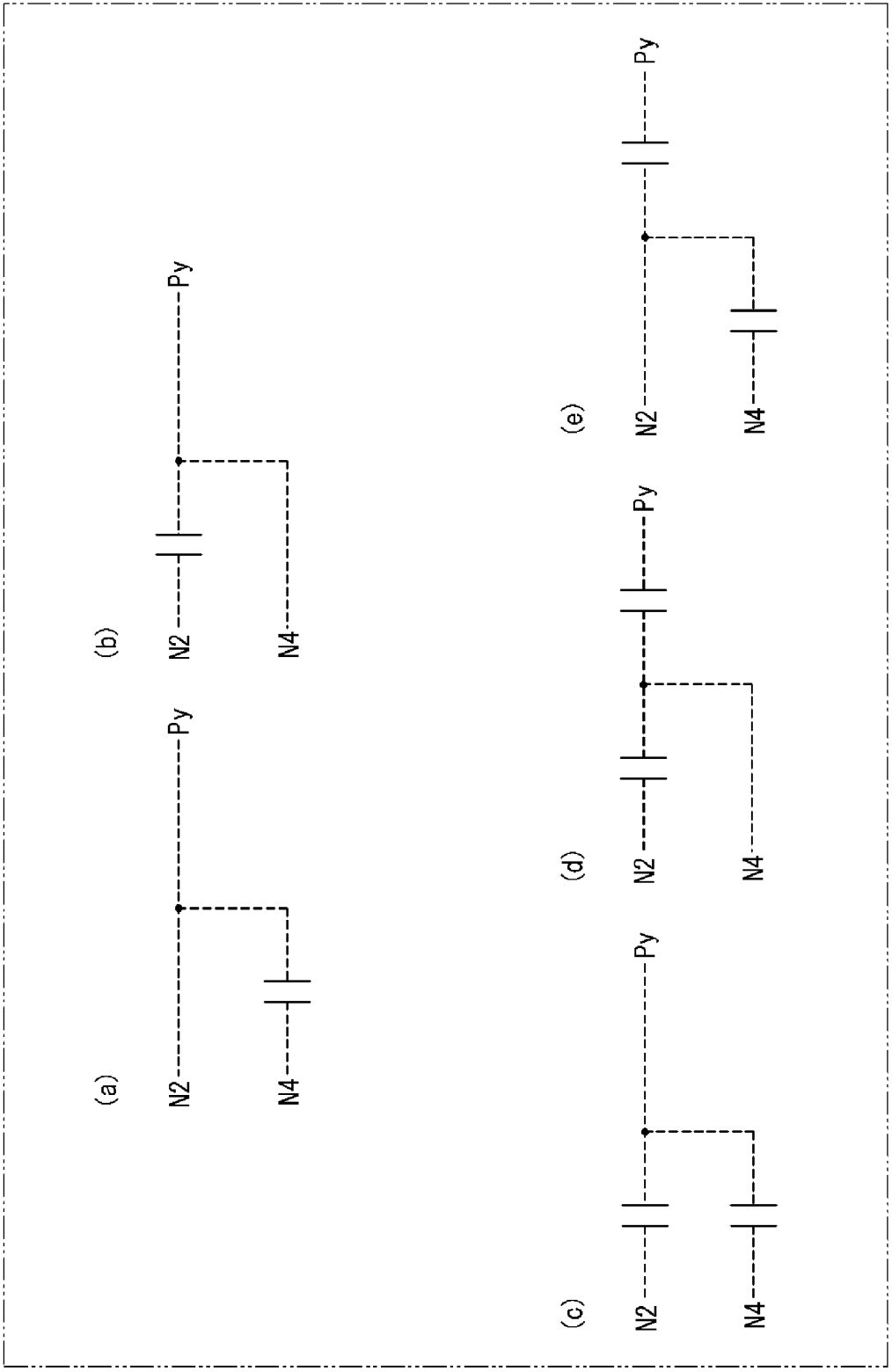
FIG. 14 is a diagram showing circuit variations of a second electrical path (dashed line) shown in FIG. 10.

FIG. 14 is a diagram showing circuit variations of the second electrical path (dashed line) shown in FIG. 10. In FIG. 14, (a) and (b) are circuit diagrams in the case where one capacitor is reduced in the second electrical path while no capacitor is reduced in the first electrical path. In the case of (a), the node N2 is directly connected to the second output port Py. The node N4 is connected to the second output port Py via a capacitor. In the case of (b), the node N4 is directly connected to the second output port Py. The node N2 is connected to the second output port Py via a capacitor.

In FIG. 14, (c), (d), and (e) are circuit diagrams in the case where one capacitor is reduced in the first electrical path while no capacitor is reduced in the second electrical path. In any of the cases of (c) (identical to FIG. 10), (d), and (e), the nodes N2 and N4 are each connected to the second output port Py via one capacitor or two capacitors.

(Topology of 6C Front Stage Circuit)

As a modification intended to increase a step-down ratio, "6C2L" is also conceivable.

Figure 15:
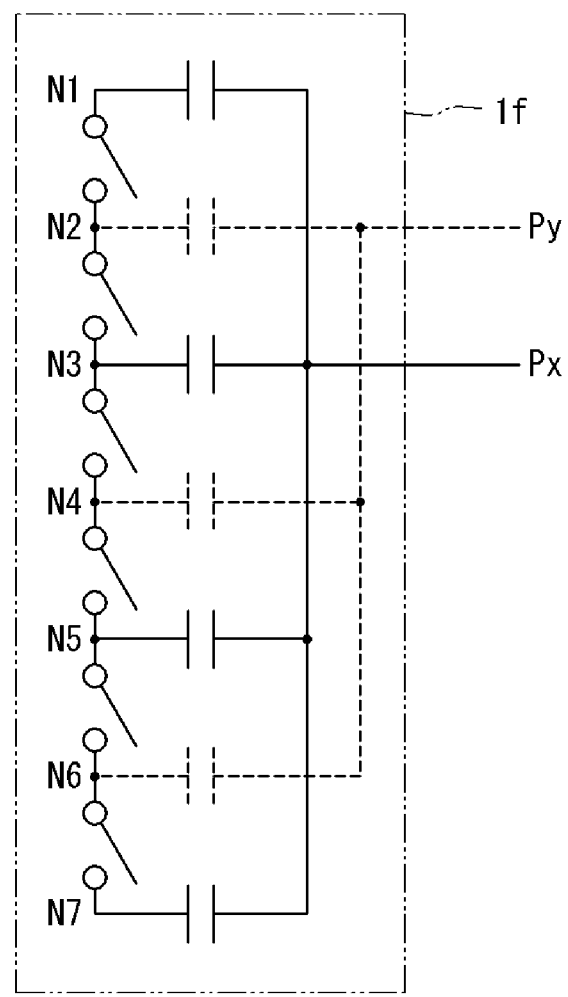
FIG. 15 is a diagram showing a main part of a front stage circuit in a "6C2L" transformer.

FIG. 15 shows a main part of a front stage circuit 1f in a "6C2L" transformer 1.

In FIG. 15, a first electrical path that combines odd nodes N1, N3, N5, and N7 as seen from one of both ends of the switch series unit and leads the odd nodes to the first output port Px is represented by a solid line, and a second electrical path that combines even nodes N2, N4, and N6 and leads the even nodes to the second output port Py is represented by a dashed line. Expressing the second electrical path by the dashed line is simply for convenience of illustration, and the second electrical path coexists with the first electrical path.

In the "6C2L" shown in FIG. 15, only one capacitor may be omitted from among seven capacitors to provide "6C". Assuming that the number of nodes is m (=7), the number of corresponding capacitors needs to be at least six.

At least one capacitor needs to be interposed between nodes that are mutually combined and connected by the first electrical path (solid line) or the second electrical path (dashed line) among the seven nodes N1 to N7, in order to realize insulation for DC therebetween.

Figure 16:
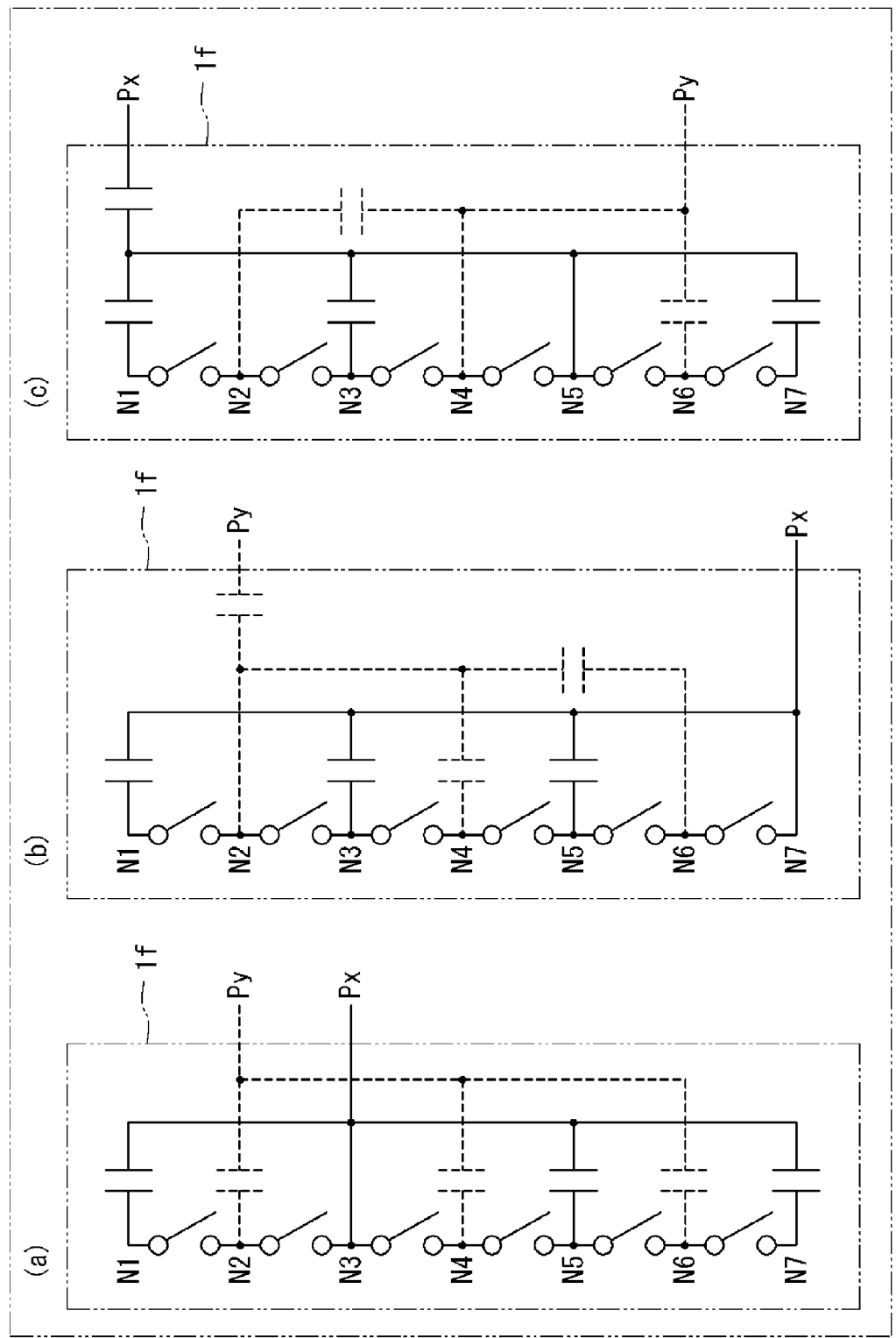
FIG. 16 is a diagram showing circuit variations in a case where the total number of capacitors are reduced by one in the first electrical path (solid line) or the second electrical path (dashed line) shown in FIG. 15.

FIG. 16 shows circuit variations in the case where one capacitor is reduced in the first electrical path (solid line) or the second electrical path (dashed line) shown in FIG. 15. In the circuit shown in (a) of FIG. 16, the node N3 is directly connected to the first output port Px without an interposed capacitor. In the circuit shown in (b), the node N7 is directly connected to the first output port Px without an interposed capacitor. In the circuit shown in (c), the node N4 is directly connected to the second output port Py without an interposed capacitor.

<<Overview of Topology>>

Further, the front stage circuit 1*f* can be similarly extended to "8C" or more.

On the basis of the various circuits exemplified above, the front stage circuit 1*f* can be topologically expressed as follows.

The front stage circuit 1*f* (see FIG. 1, FIG. 8, and FIGS. 10 to 16) includes: (a) a switch series unit composed of a plurality of switches, as many as a multiple of 2, connected in series to each other, the plurality of switches including odd-numbered switches and even-numbered switches as seen from one of both ends of the series unit, the odd-numbered switches and even-numbered switches being configured to be alternately turned ON, the switch series unit as a whole being connected in parallel to a power supply; and (b) assuming that mutual connection points of the respective switches and points at the both ends of the switch series unit are regarded as m nodes in total and the nodes are seen in order of 1 to m from one of the both ends of the switch series unit, capacitors provided on at least one electrical path of a first electrical path and a second electrical path, the first electrical path being configured to combine odd nodes and lead the odd nodes to a first output port, the second electrical path being configured to combine even nodes and lead the even nodes to a second output port, the capacitors being present so as to correspond to at least (m−1) nodes.

On the other hand, the rear stage circuit 1*r* (see FIG. 1, FIG. 7, and FIG. 9) includes: (c) an element series unit composed of a pair of semiconductor elements that are connected in series to each other and perform conducting operations of mutually opposite polarities, one of both ends of the series unit being connected to the first output port while the other end being connected to the second output port; and (d) inductors provided on at least one electrical path of a third electrical path and a fourth electrical path, the third electrical path being configured to combine two nodes that are points at the both ends of the element series unit and to lead the two nodes to one end of a load, the fourth electrical path being configured to lead one node that is a mutual connection point of the pair of semiconductor elements to the other end of the load, the inductors being present so as to correspond to at least two nodes of the three nodes in total.

If the semiconductor elements of the rear stage circuit 1*r* are diodes, the element series unit can be configured by connecting the diodes in series with conducting directions thereof being opposite to each other. If the semiconductor elements are switches, the element series unit is configured by connecting a pair of switches in series, and the pair of switches are alternately turned ON.

The transformer 1 as described above can perform transformation by the circuit configuration including the front stage circuit 1*f* and the rear stage circuit 1*r* and by switching. Using the transformer 1 as a power transformer makes it unnecessary to use a conventional transformer including a coil, an iron core, and the like. Therefore, it is possible to realize drastic size reduction and weight reduction of a transformer, and thereby realize cost reduction accordingly. In addition, problems of parasitic capacitance and occurrence of magnetic field leakage, which arise in a high-frequency transformer, are also solved, and thus a transformer with low loss can be realized. As for the power supply, either an AC power supply or a DC power supply is applicable.

<<Design of Dead Time>>

Next, design of a dead time will be described. A dead time is a transient time from a moment when control for all switches is turned OFF to when control for either switches is turned on when, for example, the odd-numbered switches SW1 and SW3 and the even-numbered switches SW2 and SW4 shown in FIG. 7 are alternately turned ON.

Figure 17:
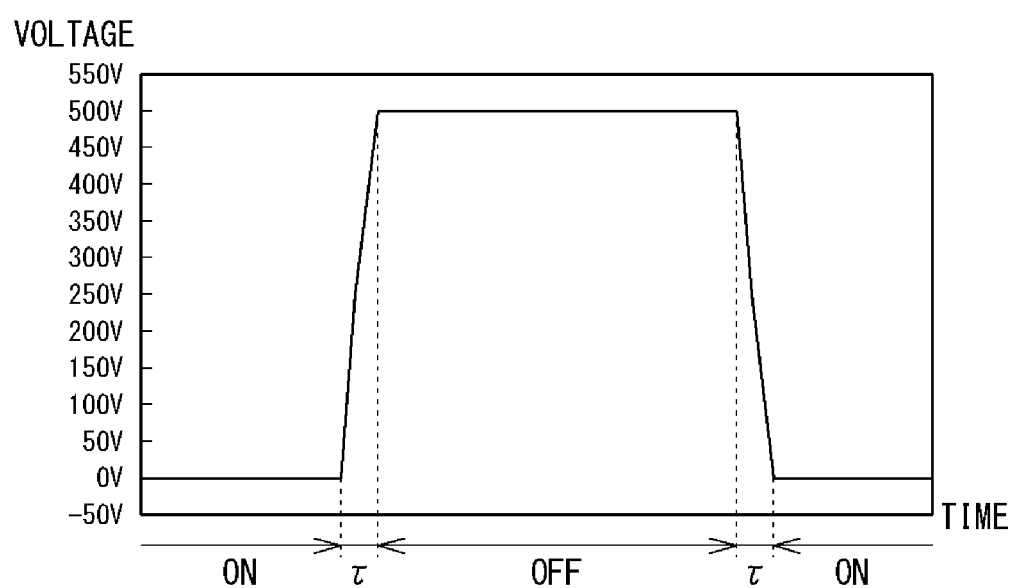
FIG. 17 is a graph showing a change in switching voltage (drain-to-source voltage) when odd-numbered or even-numbered switches change from ON to OFF and change to ON again.

FIG. 17 is a graph showing a change in switching voltage (drain-to-source voltage) when the odd-numbered switches or the even-numbered switches change from ON to OFF and then change to ON again. When the switches are ON, the switching voltage is 0 V. When the switches are OFF, the switching voltage is 500 V, for example. There is a transient voltage change in a dead time $\tau$ during the ON to OFF change or the OFF to ON change of the switches. When the switches change from OFF to ON, zero voltage transition (ZVT) in which the switching voltage drops to 0 V and thereafter the switches change to ON is desired in order to minimize switching loss.

Figure 18:
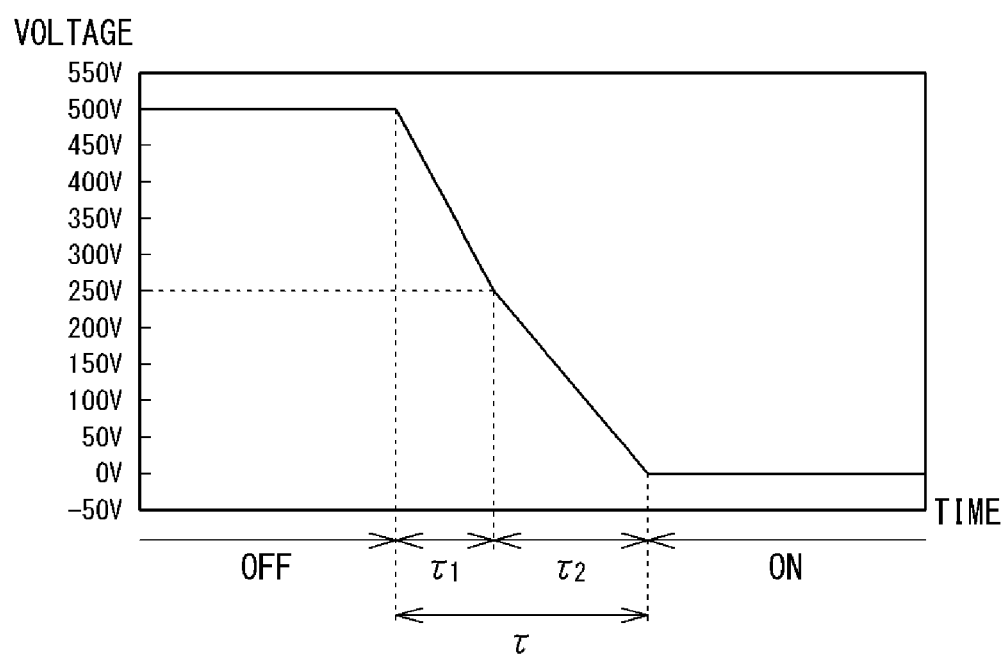
FIG. 18 is a graph showing the change from OFF to ON shown in FIG. 17, with the time on the horizontal axis being scaled up.

FIG. 18 is a graph showing a part corresponding to the OFF to ON change shown in FIG. 17, with the time on the horizontal axis being scaled up. It is found that, in FIG. 18, the dead time $\tau$ includes a first half time $\tau_1$ from 500 V to 250 V, and a subsequent second half time $\tau_2$ from 250 V to 0 V. That is, the following relationship is satisfied:

$$\tau \geq \tau_1 + \tau_2 \qquad (1)$$

The gradient of the first half time $\tau_1$ and the gradient of the second half time $\tau_2$ are slightly different from each other, and $\tau_1 < \tau_2$ is satisfied. Therefore, the dead time $\tau$ can be considered separately for the first half time $\tau_1$ and the second half time $\tau_2$. Assuming that the output voltage of 125 V from the transformer 1 is $V_{out}$, $\tau_1$: a period in which the voltage is from 4 $V_{out}$ to 2 $V_{out}$ $\tau_2$: a period in which the voltage is from 2 $V_{out}$ to 0

Figure 19:
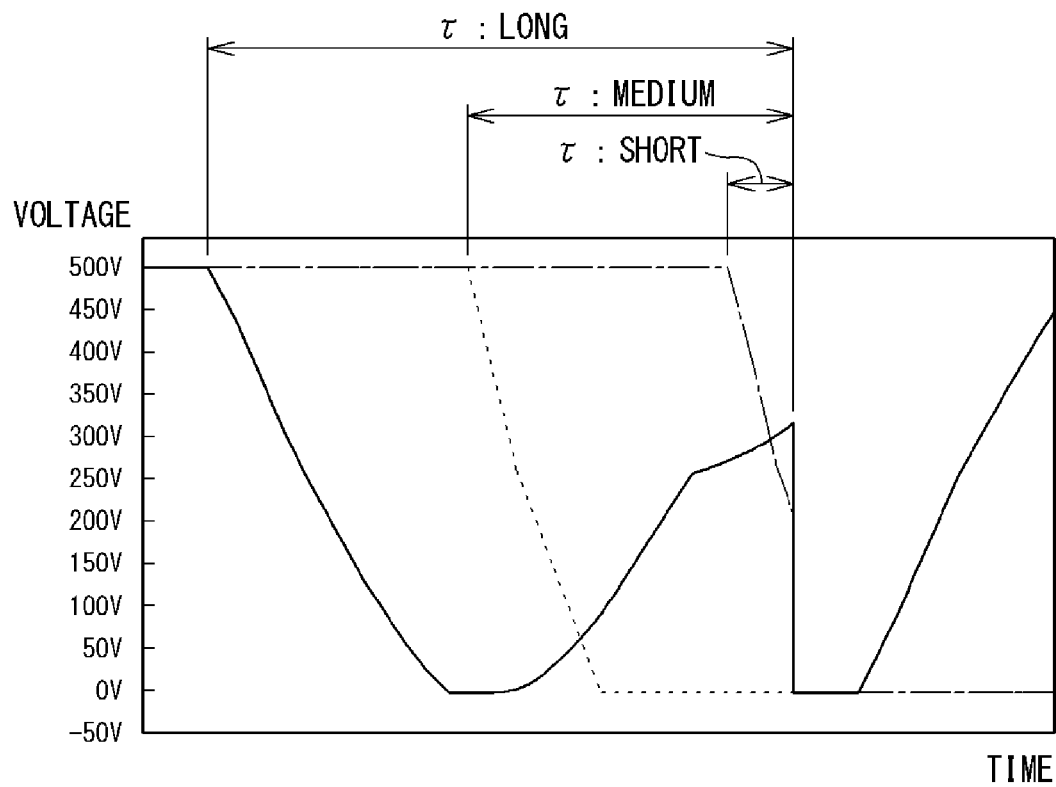
FIG. 19 is a graph showing the relationship between ZVT and the length of dead time which is set to be "long", "medium", and "short".

FIG. 19 is a graph showing the relationship between ZVT and the length of the dead time which is set to be "long", "medium", and "short". In FIG. 19, when the dead time $\tau$ is shorter than an appropriate value (medium), a voltage change indicated by an alternate long and short dash line occurs, and next ON starts before the voltage reaches 0 V. That is, this is not ZVT. On the other hand, when the dead time $\tau$ is longer than the appropriate value (medium), a voltage change indicated by a solid line occurs and the voltage once reaches 0 V, but thereafter the voltage increases again, and eventually, next ON starts with the voltage remaining increased. That is, this is also not ZVT. Therefore, there is an appropriate (not too long and not too short) range of "$\tau$" indicated by the dashed line.

Figure 20:
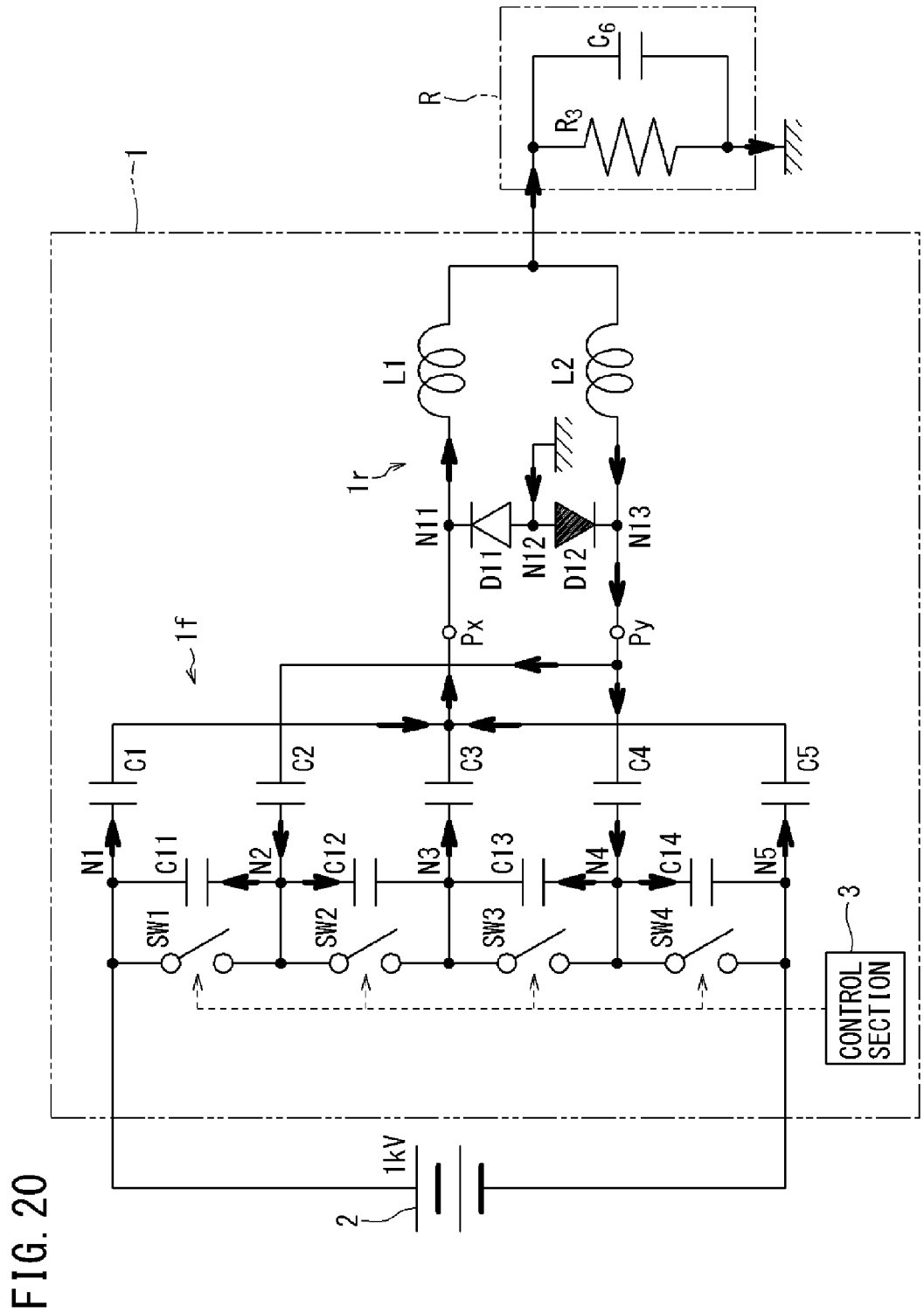
FIG. 20 is a circuit diagram in which diodes and bleeder resistors shown in FIG. 7 are omitted, and instead, floating capacitances possessed by the respective switches are shown.

FIG. 20 is a circuit diagram of a transformer 1 in which the diodes D1 to D4 and the bleeder resistors R1 and R2 shown in FIG. 7 are omitted, and instead, floating capacitances C11 to C14 possessed by the respective switches SW1 to SW4 are shown. FIG. 20 also shows a current path in the first half time $\tau_1$. Of the diodes D11 and D12, the diode D12 is in the conductive state. At this time, current $I_{L1}$ that flows in the inductor L1 flows into the floating capacitances C11 to C14. Assuming that current that flows in the inductor L2 is $I_{L2}$, current that flows into the floating capacitances C11 to C14 is $I_Q$, and current that flows in the load R is $I_R$, the following relationship is satisfied:

$$I_Q = I_{L2} + I_R = I_{L1}$$

Figure 21:
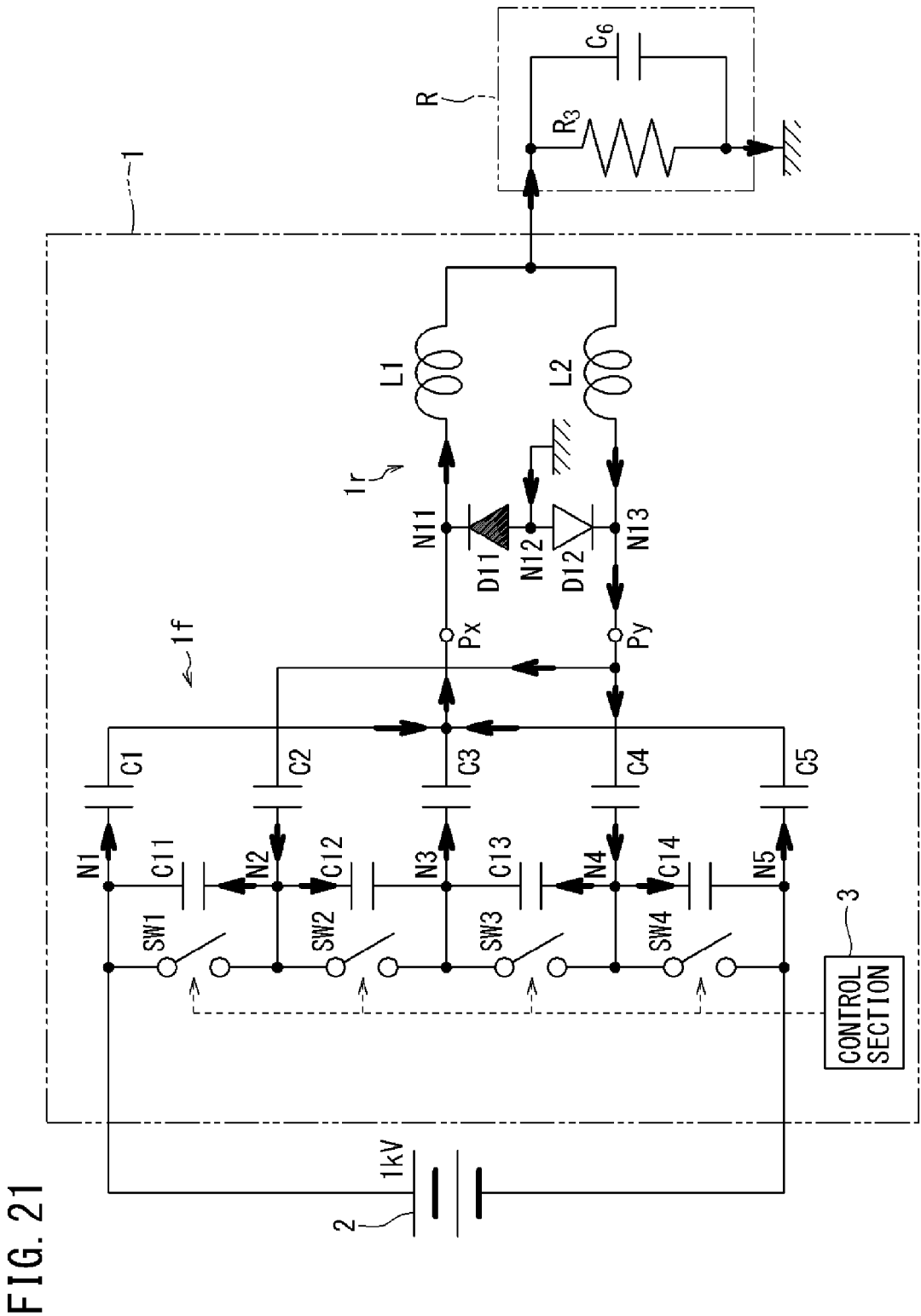
FIG. 21 is a circuit diagram of the same background as FIG. 20, in which a path of current in a second half time $\tau_2$ is also shown.

Although FIG. 21 is of the same background as FIG. 20, FIG. 21 also shows a current path in the second half time $\tau_2$. Of the diodes D11 and D12, the diode D11 is in the conductive state. At this time, current $I_{L2}$ that flows in the inductor L2 flows into the floating capacitances C11 to C14. In this case, the following relationship is satisfied:

$$I_Q = I_{L1} - I_R = I_{L2}$$

Therefore, $I_{L2}$ is smaller than $I_{L1}$.

Figure 22:
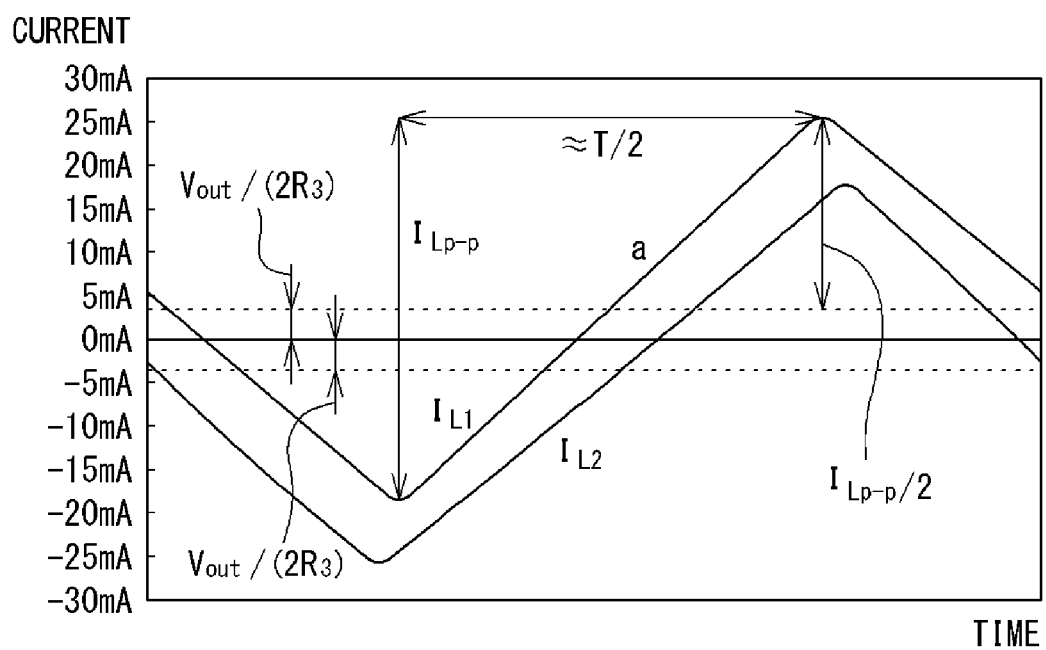
FIG. 22 is a graph showing examples of waveforms of currents that flow in inductors.

FIG. 22 is a graph showing examples of waveforms of currents that flow in the inductors L1 and L2. The current waveforms can be approximated by straight lines as shown in FIG. 22. Of the two waveforms, the upper waveform is the waveform of $I_{L1}$, and the lower waveform is the waveform of $I_{L2}$. A transition time from a minimum value to a maximum value of each waveform is half the switching cycle T.

Here, the following approximate conditions for analysis are adopted.

(Approximate Condition 1)

First, it is assumed that the step-down ratio is constant at 1/8. That is, assuming that the input voltage of the transformer 1 is $V_{in}$ and output voltage thereof is $V_{out}$, the following relationship is satisfied:

$$V_{out} \approx V_{in}/8 = 125 [V]$$

(Approximate Condition 2)

The voltage waveform at both ends of each of the inductors L1 and L2 is a rectangular wave having a duty ratio of 50%.

(Approximate Condition 3)

The absolute values of voltages $V_{L1}$ and $V_{L2}$ at both ends of the inductors L1 and L2, respectively, are the output voltage. That is, assuming that the maximum value of voltage $V_L$ is $V_{Lmax}$ and the minimum value of voltage $V_L$ is $V_{Lmin}$, the following relationships are satisfied:

$$V_{Lmax} \approx V_{out}$$

$$V_{Lmin} \approx -V_{out}$$

For simplifying calculation, $$V_{L1} \approx V_{L2} \approx \pm V_{out}$$

Assuming that the inductors L1 and L2 have a common inductance value L, the voltage $V_L$ at the both ends of each of the inductors L1 and L2 is expressed by $$V_L = L(dI_L(t)/dt) = L \cdot a$$

where a is inclination of a straight line.
Therefore, the following relationship is satisfied:

$$a = V_{out}/L \quad (2)$$

In addition, peak-to-peak current $I_{Lp\text{-}p}$ is expressed by $$I_{Lp\text{-}p} = a(T/2)$$

and therefore, the following relationship is satisfied.

$$I_{Lp\text{-}p} = T \cdot V_{out}/2L \quad (3)$$

Figure 23:
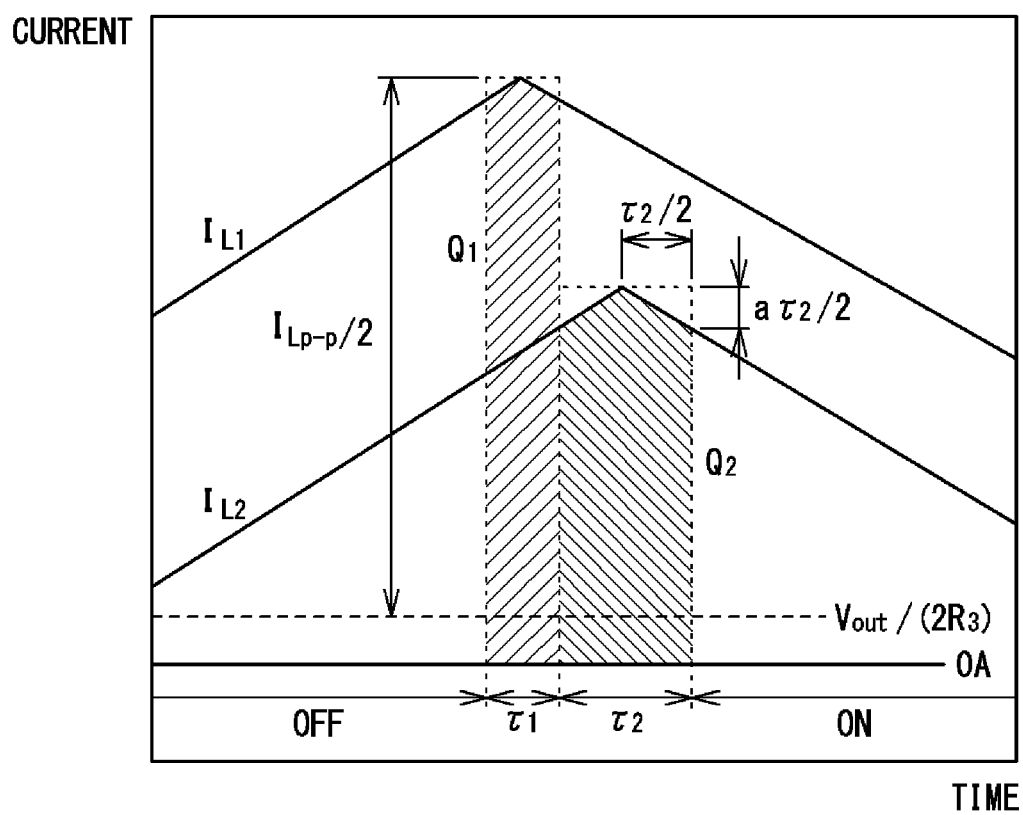
FIG. 23 is an enlarged view showing portions near the peaks of the waveforms shown in FIG. 22.

FIG. 23 is an enlarged view showing a portion near the peaks of the waveforms shown in FIG. 22. In FIG. 23, electric charges $Q_1$ that flow into floating capacitance $C_{DS}$ (general term for C11 to C14) during the first half time $\tau_1$ are represented by a hatched area on the left side in FIG. 23. That is, the following expression is obtained:

$$Q_1 = \{(I_{Lp\text{-}p}/2) + (V_{out}/2R_3)\}\tau_1 - (\tau_1/2)\cdot(a\tau_1/2) \quad (4)$$

In addition, electric charges $Q_2$ that flow into the floating capacitance $C_{DS}$ during the second half time $\tau_2$ are represented by a hatched area on the right side in FIG. 23. That is, the following expression is obtained:

$$Q_2 = \{(I_{Lp\text{-}p}/2) - (V_{out}/2R_3)\}\tau_2 - (\tau_2/2)\cdot(a\tau_2/2) \quad (5)$$

When the above expression (4) is developed by substituting expressions (2) and (3) for $Q_1$ of expression (4), the following expression is obtained:

$$Q_1 = (V_{out} \tau_1/2)\{(T/2L) + (1/R_3)\} - (V_{out} \tau_1^2/4L) \quad (6)$$

When the above expression (5) is developed by substituting expressions (2) and (3) for $Q_2$ of expression (5), the following expression is obtained:

$$Q_2 = (V_{out} \tau_2/2)\{(T/2L) - (1/R_3)\} - (V_{out} \tau_2^2/4L) \quad (7)$$

Because of the electric charges $Q_1$, electric charges equivalent to $V_{in}(=1 \text{ kV})/4$, i.e., 250 V ($=2V_{out}$) move to the four floating capacitances $C_{DS}$ (C11 to C14), and therefore, the following expression is obtained:

$$Q_1 = 4C_{DS} \cdot 2V_{out} = 8C_{DS} \cdot V_{out} \quad (8)$$

When a quadratic equation obtained from expressions (6) and (8) is solved with respect to $\tau_1$, the following expression is obtained:

$$\tau_1 = (T/2) + (L/R_3) - (1/2)[\{T + (2L/R_3)\}^2 - 128LC_{DS}]^{1/2} \quad (9)$$

Likewise, because of the electric charges $Q_2$, electric charges equivalent to $V_{in}(=1 \text{ kV})/4$, i.e., 250 V($=2V_{out}$) move to the four floating capacitances $C_{DS}$ (C11 to C14), and therefore, the following expression is obtained:

$$Q_2 = 4C_{DS} \cdot 2V_{out} = 8C_{DS} \cdot V_{out} \quad (10)$$

When a quadratic equation obtained from expressions (7) and (10) is solved with respect to $\tau_2$, the following expression is obtained:

$$\tau_2 = (T/2) - (L/R_3) - (1/2)[\{T - (2L/R_3)\}^2 - 128LC_{DS}]^{1/2} \quad (11)$$

Next, the maximum value of the dead time $\tau$ will be considered.

Figure 24:
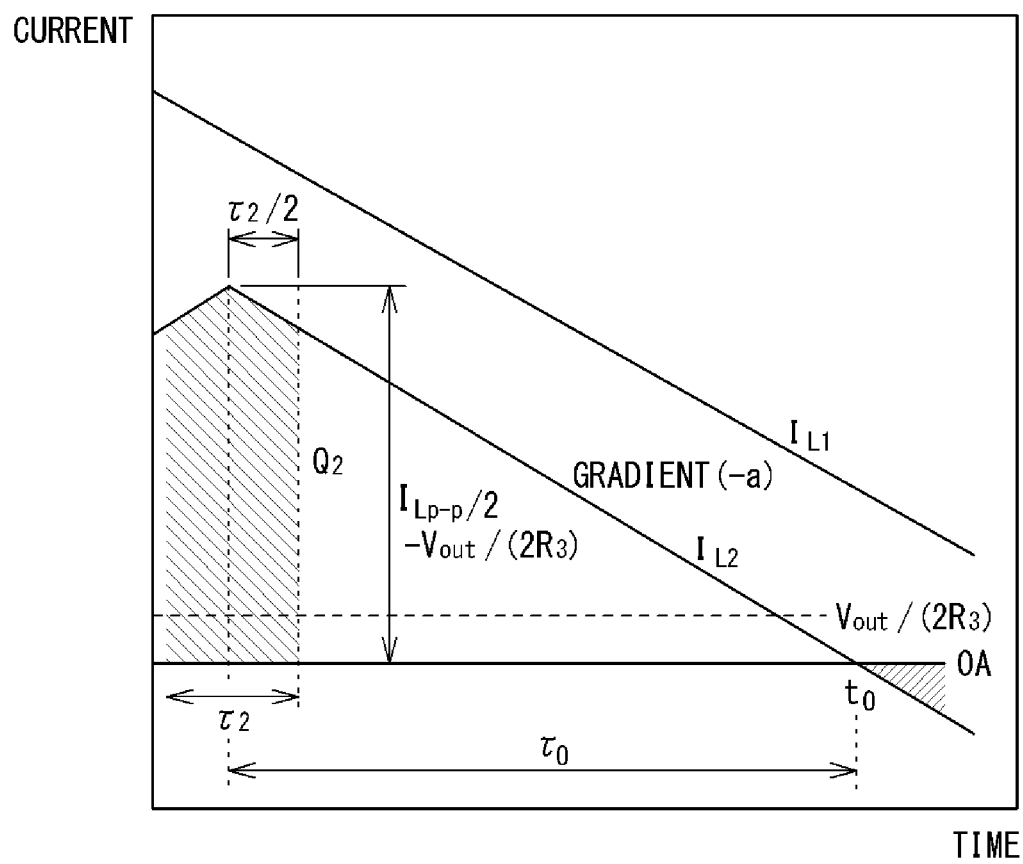
FIG. 24 is a diagram showing the waveforms shown in FIG. 23 extended in the time-axis direction (rightward direction).

FIG. 24 is a diagram showing the waveforms shown in FIG. 23 extended in the time-axis direction (rightward direction). In a second half region of the second half time $\tau 2$, the gradient of current becomes $(-a)$. Therefore, time $t_0$ exists, at which $I_{L2}=0$. After time $t_0$ has passed, negative current flows. This means that electric charges corresponding to a lower-right hatched portion return on and after time $t_0$. If so, the switching voltage increases again. Therefore, the dead time $\tau$ must be set so as not to reach time $t_0$. The maximum value of the dead time that does not reach to is referred to as $\tau_{max}$.

In FIG. 24, assuming that a time period for the current $I_{L2}$ from the positive peak to 0V is $\tau_0$, the following expression is obtained:

$$\{(I_{Lp\text{-}p}/2) - (V_{out}/2R_3)\} - a\tau_0 = 0 \quad (12)$$

When expression (12) is solved with respect to $\tau_0$ by substituting expressions (2) and (3) for expression (12), the following expression is obtained:

$$\tau_0 = (T/4) - (L/2R_3) \quad (13)$$

From FIG. 24, the following expression is obtained:

$$\tau_{max} = \tau_0 + (\tau_2/2) + \tau_1 \quad (14)$$

On the basis of expressions (13) and (14), the following expression is obtained:

$$\tau_{max} = (T/4) - (L/2R_3) + (\tau_2/2) + \tau_1 \quad (14a)$$

It is needless to say that $\tau_{max}$ must satisfy $\tau_{max} < (T/2)$ in order to secure ON time of switching.

Consequently, the range of the dead time τ should be set as follows:

$$\tau_1 + \tau_2 \leq \tau \leq \tau_0 + (\tau_2/2) + \tau_1 \quad (15)$$

whereto, $\tau_0$, $\tau_1$, and $\tau_2$ are as follows:

$$\tau_0 = \frac{T}{4} - \frac{L}{2R_3} \quad (16)$$

$$\tau_1 = \frac{T}{2} + \frac{L}{R_3} - \frac{1}{2}\sqrt{\left(T + \frac{2L}{R_3}\right)^2 - 128LC_{DS}}$$

$$\tau_2 = \frac{T}{2} - \frac{L}{R_3} - \frac{1}{2}\sqrt{\left(T - \frac{2L}{R_3}\right)^2 - 128LC_{DS}}$$

The above expression (16) is generalized as follows, taking into consideration multistage configuration of the front stage circuit. Expression (15) is unchanged even when multistage configuration of the front stage circuit is considered.

Assuming that the number of the floating capacitances $C_{DS}$ (equal to the number of the switches constituting the switch series unit) is n, and the n-th floating capacitance counted in order from 1 is $C_{nDS}$, expression (16) is generalized as follows:

$$\tau_0 = \frac{T}{4} - \frac{L}{2R_3} \quad (17)$$

$$\tau_1 = \frac{T}{2} + \frac{L}{R_3} - \frac{1}{2}\sqrt{\left(T + \frac{2L}{R_3}\right)^2 - 32L\sum_{n=1}^{n} C_{nDS}}$$

$$\tau_2 = \frac{T}{2} - \frac{L}{R_3} - \frac{1}{2}\sqrt{\left(T - \frac{2L}{R_3}\right)^2 - 32L\sum_{n=1}^{n} C_{nDS}}$$

wherein the sign of a value in each radical sign is plus, and $\tau_1 < \tau_2$ is satisfied.

It has been known that the range of the dead time τ is determined by the topology of the rear stage circuit, regardless of the topology of the front stage circuit. When the rear stage circuit has the configuration shown in (b) of FIG. 9, τ is given by the above expressions (15) and (17).

On the other hand, when the rear stage circuit has the configuration other than that shown in (b) of FIG. 9, in other words, any of the configurations shown in (a), (c), (d), and (e) of FIG. 9, τ is given by the following expressions (15a) and (17a).

$$\tau_1 + \tau_2 \leq \tau \leq \tau_0 + \tau_1 \quad (15a)$$

where $\tau_0$, $\tau_1$, and $\tau_2$ are as follows:

$$\tau_0 = \frac{T}{4} - \frac{L_1}{4R_3} \quad (17a)$$

$$\tau_1 = \frac{T}{4} + \frac{L_1}{4R_3} - \frac{1}{4}\sqrt{\left(T + \frac{L_1}{R_3}\right)^2 - 32L_1\sum_{n=1}^{n} C_{nDS}}$$

$$\tau_2 = \frac{T}{4} - \frac{L_1}{4R_3} - \frac{1}{4}\sqrt{\left(T - \frac{L_1}{R_3}\right)^2 - 32L_1\sum_{n=1}^{n} C_{nDS}}$$

As described above, when the topology of the rear stage is any of (a), (c), (d), and (e) of FIG. 9, the inductance that is dominant for the dead time τ is $L_1$, only the inductance $\tau_1$ appears in expression (17a).

(Conclusion)

As described above in detail, for example, in FIG. 7, the control section 3 of the transformer 1, after the time at which the dead time has started, obtains: the first half time $\tau_1$ which can be calculated on the basis of the electric charges that move from the inductor L1 to the floating capacitance $C_{DS}$ of the switch while one (D12) of the diodes D11 and D12 is in the conductive state; and the second half time $\tau_2$ which can be calculated on the basis of the electric charges that move from the inductor L2 to the floating capacitance $C_{DS}$ of the switch while one (D11) of the diodes D11 and D12 is in the conductive state, and then the control section 3 can determine the dead time τ on the basis of the first half time $\tau_1$ and the second half time $\tau_2$.

Thus, on the basis of the times $\tau_1$ and $\tau_2$ calculated focusing on movement of the electric charges during the dead time, an appropriate dead time τ can be determined to realize zero voltage transition (ZVT).

Further, the control section 3 terminates the dead time τ before the electric charges that have moved to the floating capacitance $C_{DS}$ return to the inductors L1 and L2, thereby preventing the switching voltage from increasing again.

Further, the appropriate range of the dead time τ can be precisely determined on the basis of the above expressions (15) to (17), thereby reliably realizing zero voltage transition.

<<Verification of Effect Of Dead Time τ>>

Regarding various transformers in which the dead time τ is designed within the above-described range, the performances thereof have been verified. The verification results will be described below.

<Condition 1>

Circuit configuration: "2C2L"

Inductance L of inductors L1 and L2=15 [mH]

Resistance $R_3$ of load=15625 [Ω]

Floating capacitance $C_{DS}$=5 [pF]

In the case of the condition 1, the minimum value and the maximum value of the dead time τ are calculated as follows on the basis of above expressions (15) and (17).

Minimum value $\tau_{min}$=253 [ns]

Maximum value $\tau_{max}$=2197 [ns]

Figure 25:
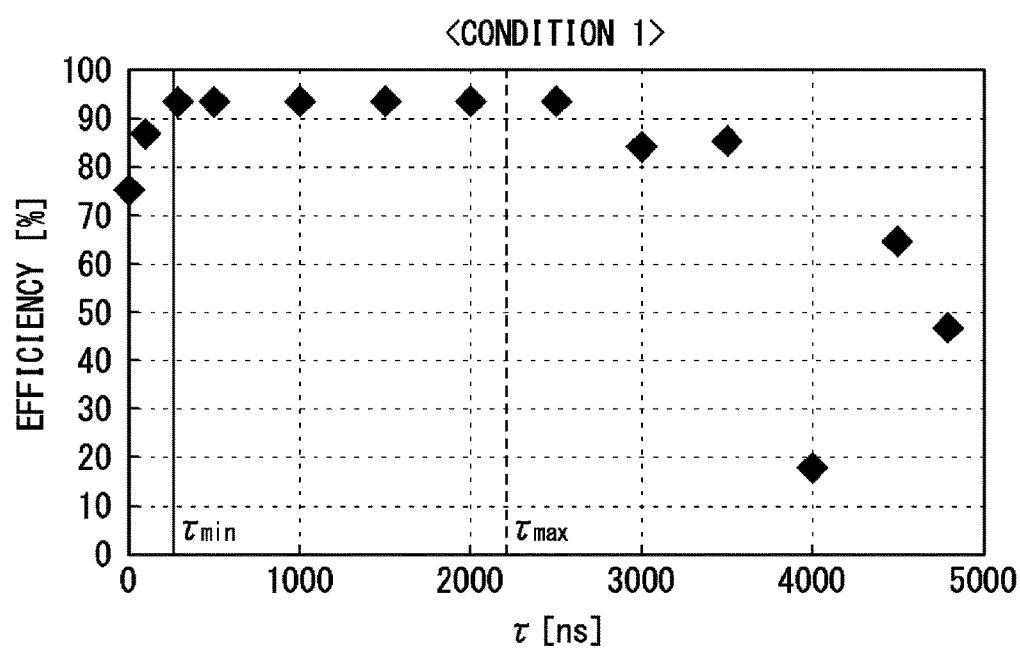
FIG. 25 is a graph showing the relationship between dead time $\tau$ [ns] and efficiency [%] in the case of condition 1.

FIG. 25 is a graph showing the relationship between the dead time τ [ns] and efficiency [%] in the case of the condition 1. When the calculated $\tau_{min}$ and $\tau_{max}$ are plotted on the graph, it is found that these values correspond to a range in which the efficiency is excellent on the characteristics shown in the graph.

Figure 26:
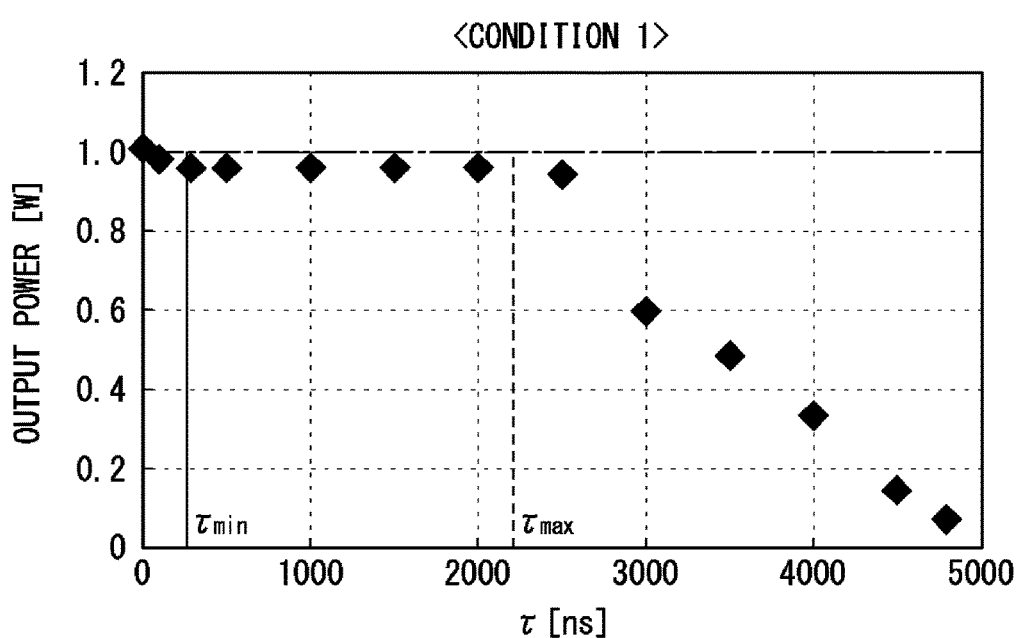
FIG. 26 is a graph showing the relationship between dead time $\tau$ [ns] and output power [W] of the transformer in the case of condition 1.

FIG. 26 is a graph showing the relationship between the dead time τ [ns] and output power [W] of the transformer in the case of the condition 1. When the calculated $\tau_{min}$ and $\tau_{max}$ are plotted on the graph, it is found that these values correspond to a range in which stable high output is achieved on the characteristics shown in the graph.

<Condition 2>

Circuit configuration: "2C2L"

Inductance L of inductors L1 and L2=15 [mH]

Resistance $R_3$ of load=7000 [Ω]

Floating capacitance $C_{DS}$=5 [pF]

In the case of the above condition 2, the minimum value and the maximum value of the dead time $\tau$ are calculated as follows on the basis of expressions (15) and (17).

Minimum value $\tau_{min}$=303 [ns]
Maximum value $\tau_{max}$=1622 [ns]

Figure 27:
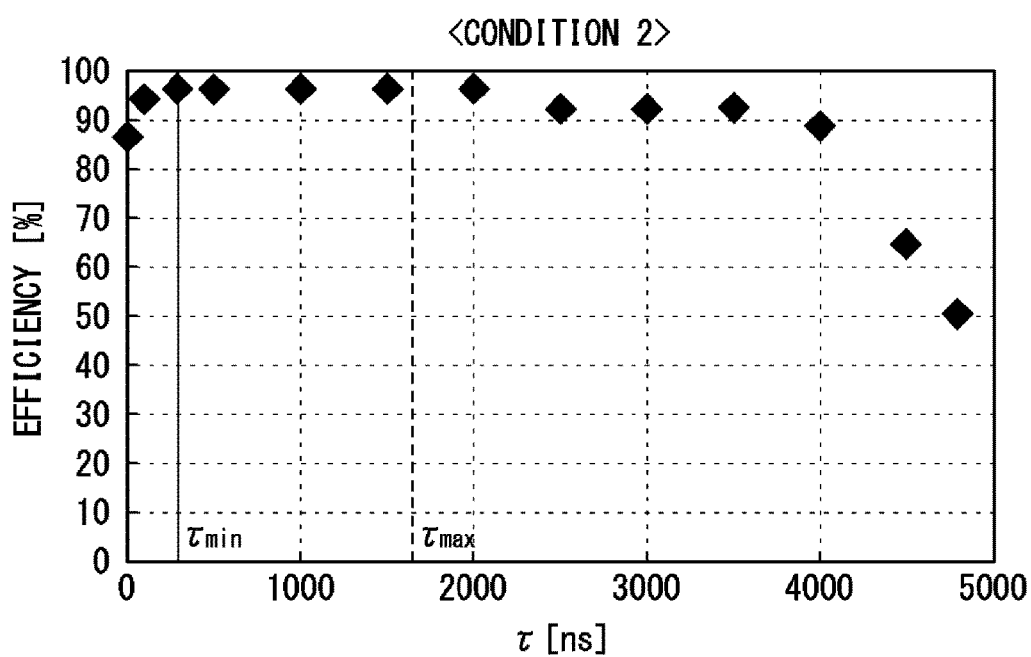
FIG. 27 is a graph showing the relationship between dead time $\tau$ [ns] and efficiency [%] in the case of condition 2.

FIG. 27 is a graph showing the relationship between the dead time $\tau$ [ns] and efficiency [%] in the case of the condition 2. When the calculated $\tau_{min}$ and $\tau_{max}$ are plotted on the graph, it is found that these values correspond to a range in which the efficiency is excellent on the characteristics shown in the graph.

Figure 28:
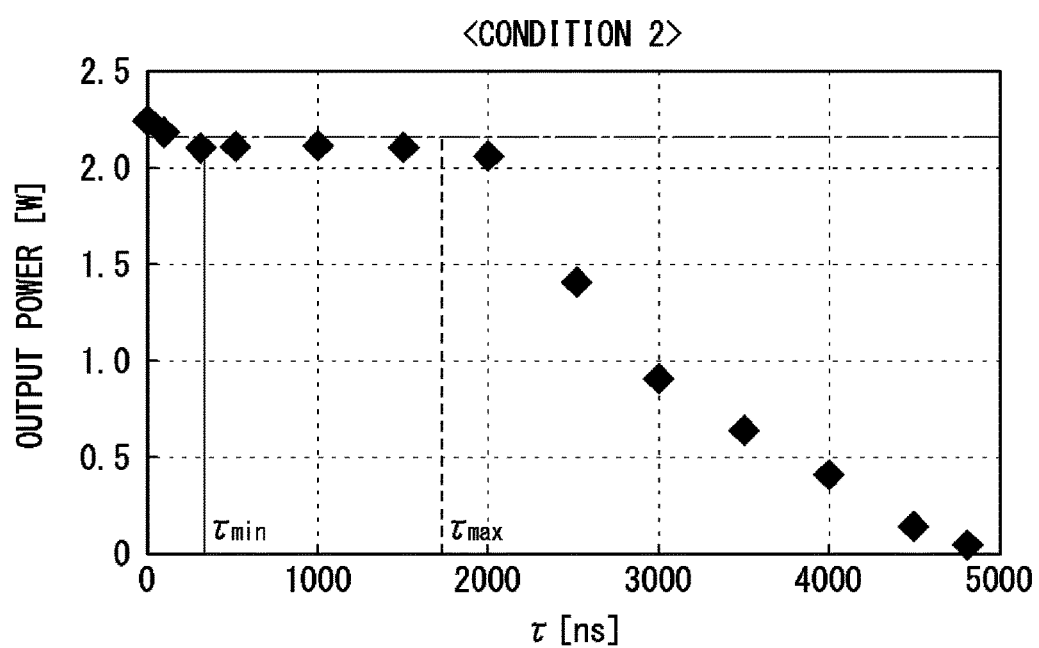
FIG. 28 is a graph showing the relationship between dead time $\tau$ [ns] and output power [W] of the transformer in the case of condition 2.

FIG. 28 is a graph showing the relationship between the dead time $\tau$ [ns] and output power [W] of the transformer in the case of the condition 2. When the calculated $\tau_{min}$ and $\tau_{max}$ are plotted on the graph, it is found that these values correspond to a range in which stable high output is achieved on the characteristics shown in the graph.

<Condition 3>
Circuit configuration: "2C2L"
Inductance L of inductors L1 and L2=15 [mH]
Resistance $R_3$ of load=15625 [Ω]
Floating capacitance $C_{DS}$=10 [pF]

In the case of the above condition 3, the minimum value and the maximum value of the dead time $\tau$ are calculated as follows on the basis of expressions (15) and (17).

Minimum value $\tau_{min}$=514 [ns]
Maximum value $\tau_{max}$=2379 [ns]

Figure 29:
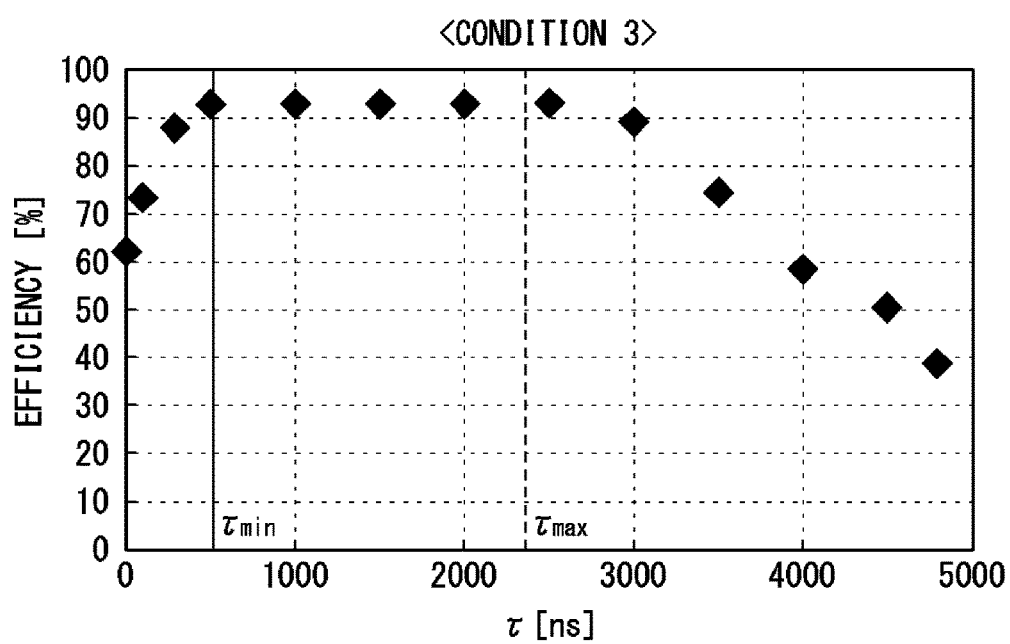
FIG. 29 is a graph showing the relationship between dead time $\tau$ [ns] and efficiency [%] in the case of condition 3.

FIG. 29 is a graph showing the relationship between the dead time $\tau$ [ns] and efficiency [%] in the case of the condition 3. When the calculated $\tau_{min}$ and $\tau_{max}$ are plotted on the graph, it is found that these values correspond to a range in which the efficiency is excellent on the characteristics shown in the graph.

Figure 30:
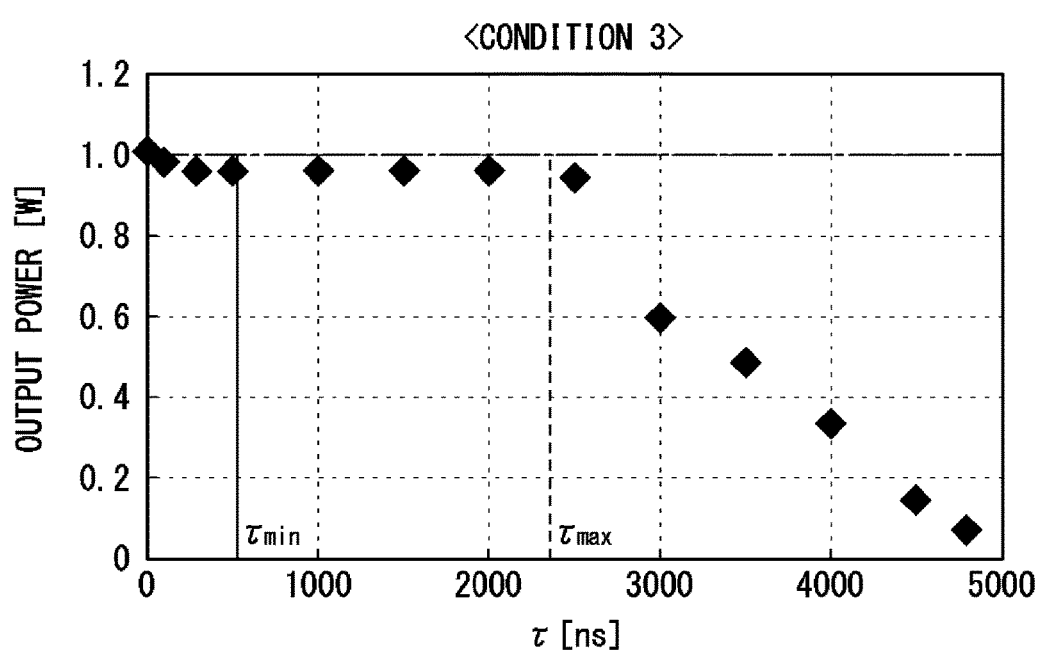
FIG. 30 is a graph showing the relationship between dead time $\tau$ [ns] and output power [W] of the transformer in the case of condition 3.

FIG. 30 is a graph showing the relationship between the dead time $\tau$ [ns] and output power [W] of the transformer in the case of the condition 3. When the calculated $\tau_{min}$ and $\tau_{max}$ are plotted on the graph, it is found that these values correspond to a range in which stable high output is achieved on the characteristics shown in the graph.

<Condition 4>
Circuit configuration: "2C2L"
Inductance L of inductors L1 and L2=7.5 [mH]
Resistance $R_3$ of load=15625 [Ω]
Floating capacitance $C_{DS}$=5 [pF]

In the case of the above condition 4, the minimum value and the maximum value of the dead time $\tau$ are calculated as follows on the basis of expressions (15) and (17).

Minimum value $\tau_{min}$=122 [ns]
Maximum value $\tau_{min}$=2348 [ns]

Figure 31:
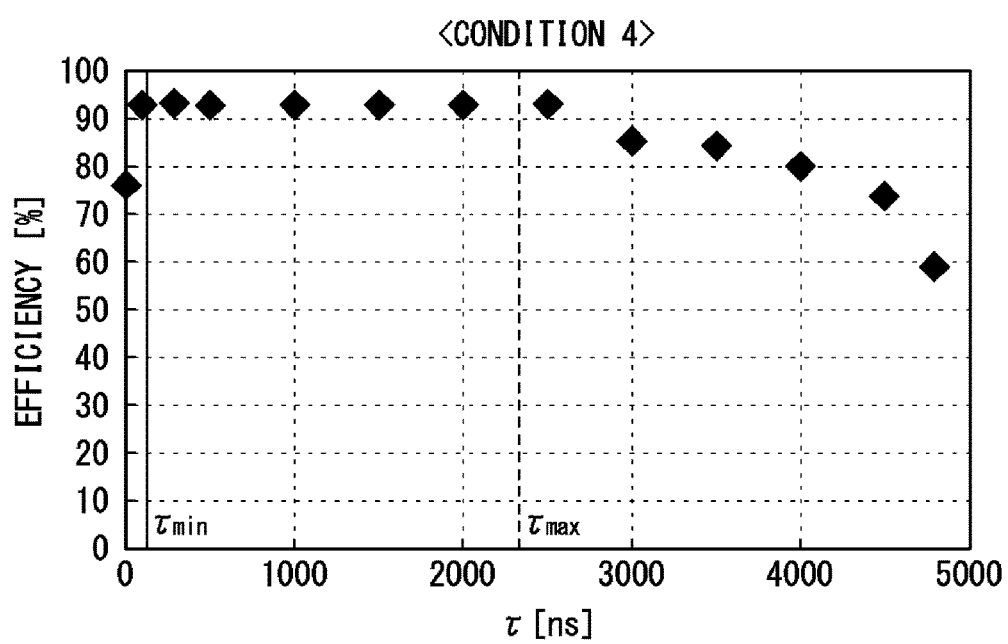
FIG. 31 is a graph showing the relationship between dead time $\tau$ [ns] and efficiency [%] in the case of condition 4.

FIG. 31 is a graph showing the relationship between the dead time $\tau$ [ns] and efficiency [%] in the case of the condition 4. When the calculated $\tau_{min}$ and $\tau_{max}$ are plotted on the graph, it is found that these values correspond to a range in which the efficiency is excellent on the characteristics shown in the graph.

Figure 32:
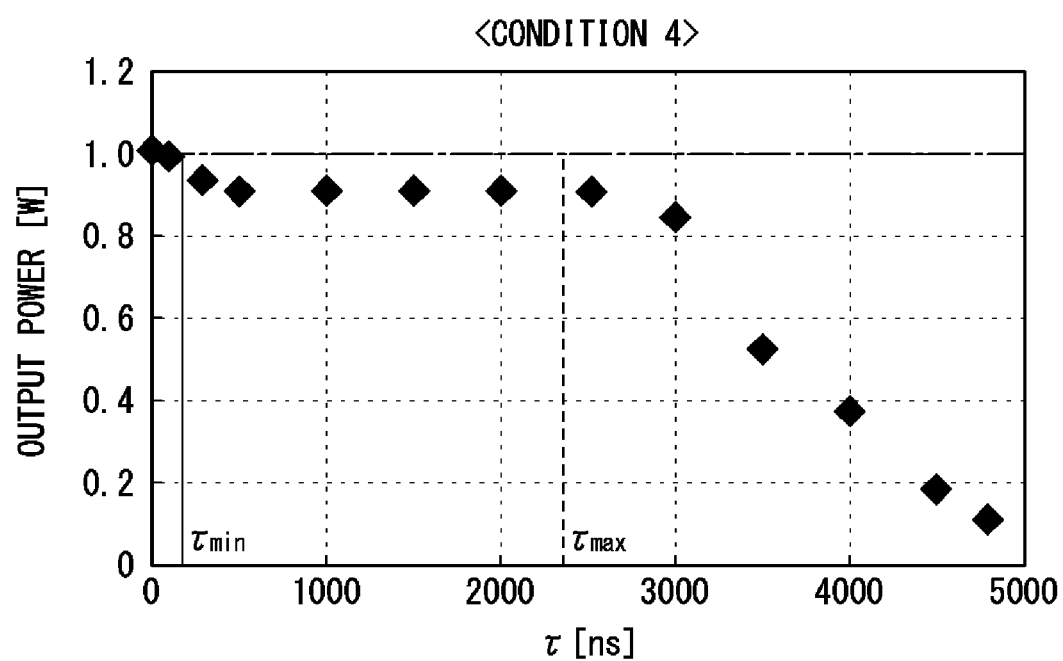
FIG. 32 is a graph showing the relationship between dead time $\tau$ [ns] and output power [W] of the transformer in the case of condition 4.

FIG. 32 is a graph showing the relationship between the dead time $\tau$ [ns] and output power [W] of the transformer in the case of the condition 4. When the calculated $\tau_{min}$ and $\tau_{max}$ are plotted on the graph, it is found that these values correspond to a range in which stable high output is achieved on the characteristics shown in the graph.

<Condition 5>
Circuit configuration: "6C2L"
Inductance L of inductors L1 and L2=15 [mH]
Resistance $R_3$ of load=15625 [Ω]
Floating capacitance $C_{DS}$=5 [pF]

In the case of the above condition 5, the minimum value and the maximum value of the dead time $\tau$ are calculated as follows on the basis of expressions (15) and (17).

Minimum value $\tau_{min}$=783 [ns]
Maximum value $\tau_{max}$=2567 [ns]

Figure 33:
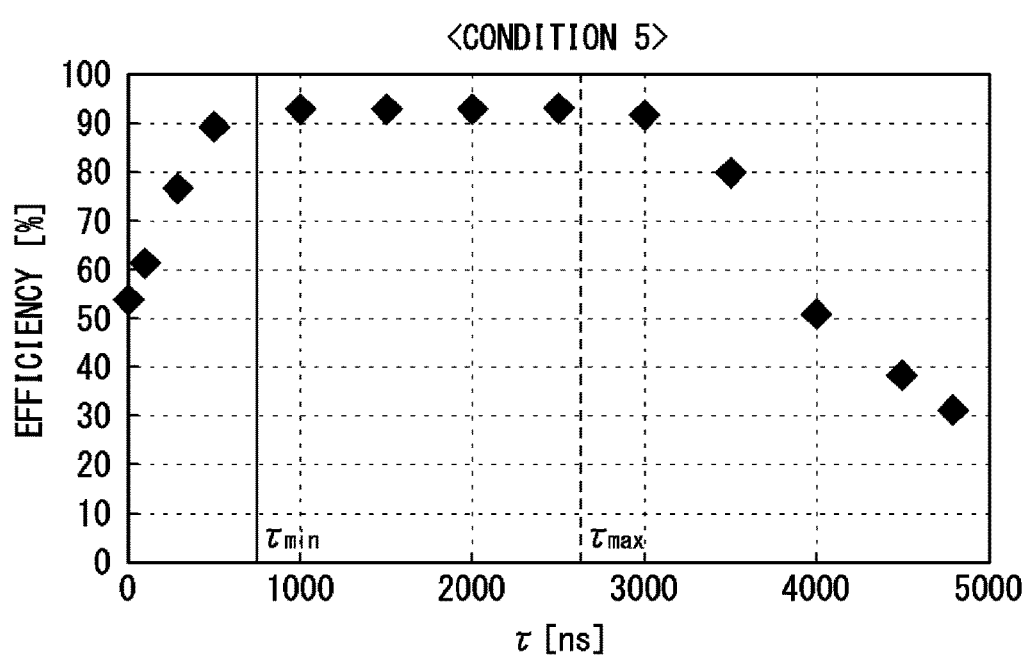
FIG. 33 is a graph showing the relationship between dead time $\tau$ [ns] and efficiency [%] in the case of condition 5.

FIG. 33 is a graph showing the relationship between the dead time $\tau$ [ns] and efficiency [%] in the case of the condition 5. When the calculated $\tau_{min}$ and $\tau_{max}$ are plotted on the graph, it is found that these values correspond to a range in which the efficiency is excellent on the characteristics shown in the graph.

Figure 34:
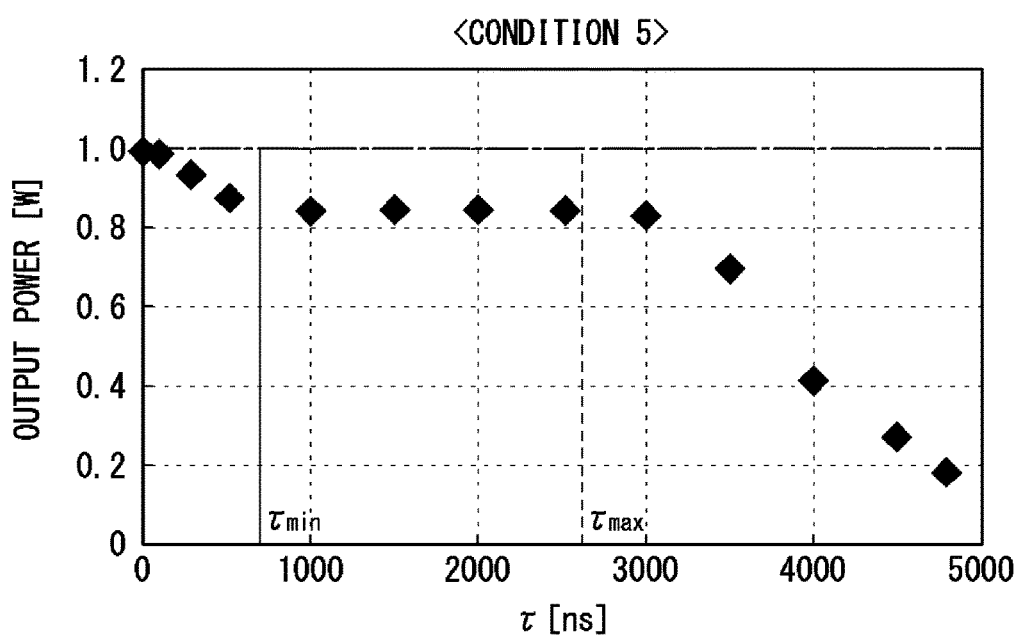
FIG. 34 is a graph showing the relationship between dead time $\tau$ [ns] and output power [W] of the transformer in the case of condition 5.

FIG. 34 is a graph showing the relationship between the dead time $\tau$ [ns] and output power [W] of the transformer in the case of the condition 5. When the calculated $\tau_{min}$ and $\tau_{max}$ are plotted on the graph, it is found that these values correspond to a range in which stable high output is achieved on the characteristics shown in the graph.

<Condition 6>
Circuit configuration: "6C2L"
Inductance L of inductors L1 and L2=15 [mH]
Resistance $R_3$ of load=7000 [Ω]
Floating capacitance $C_{DS}$=5 [pF]

In the case of the above condition 6, the minimum value and the maximum value of the dead time $\tau$ are calculated as follows on the basis of expressions (15) and (17).

Minimum value $\tau_{min}$=978 [ns]
Maximum value $\tau_{max}$=2046 [ns]

Figure 35:
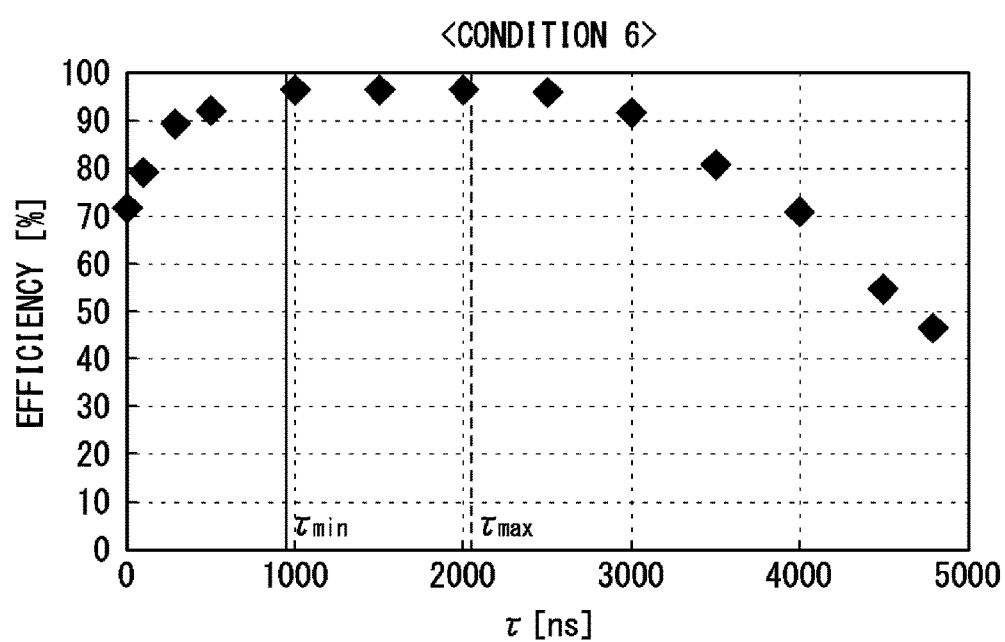
FIG. 35 is a graph showing the relationship between dead time $\tau$ [ns] and efficiency [%] in the case of condition 6.

FIG. 35 is a graph showing the relationship between the dead time $\tau$ [ns] and efficiency [%] in the case of the condition 6. When the calculated $\tau_{min}$ and $\tau_{max}$ are plotted on the graph, it is found that these values correspond to a range in which the efficiency is excellent on the characteristics shown in the graph.

Figure 36:
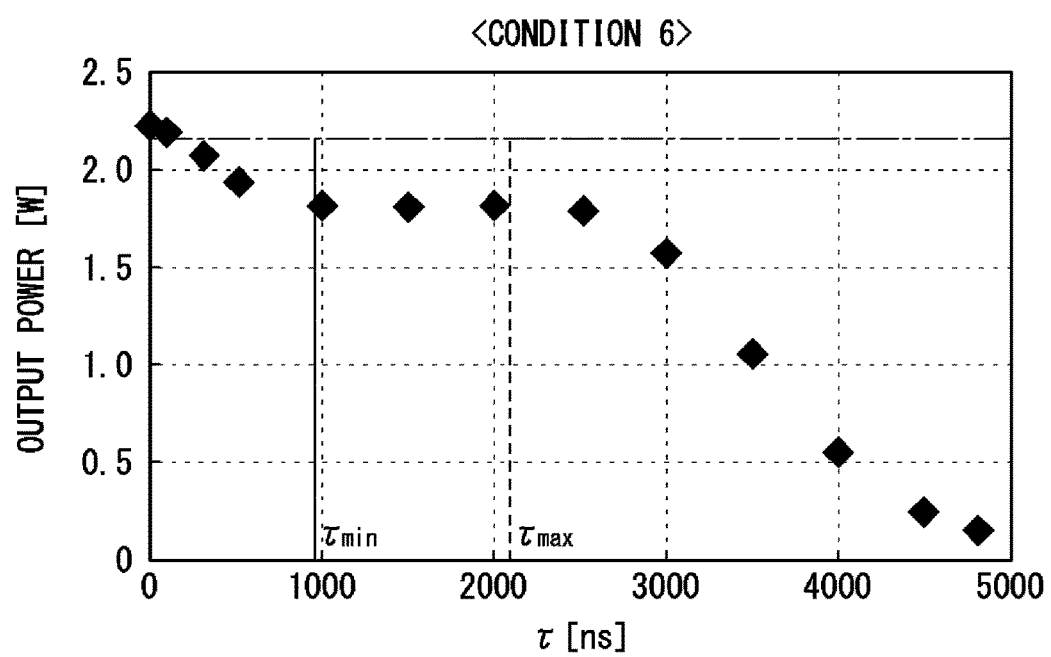
FIG. 36 is a graph showing the relationship between dead time $\tau$ [ns] and output power [W] of the transformer in the case of condition 6.

FIG. 36 is a graph showing the relationship between the dead time $\tau$ [ns] and output power [W] of the transformer in the case of the condition 6. When the calculated $\tau_{min}$ and $\tau_{max}$ are plotted on the graph, it is found that these values correspond to a range in which stable high output is achieved on the characteristics shown in the graph.

<Condition 7>
Circuit configuration: "6C2L"
Inductance L of inductors L1 and L2=15 [mH]
Resistance $R_3$ of load=15625 [Ω]
Floating capacitance $C_{DS}$=10 [pF]

In the case of the above condition 7, the minimum value and the maximum value of the dead time $\tau$ are calculated as follows on the basis of expressions (15) and (17).

Minimum value $\tau_{min}$=1658 [ns]
Maximum value $\tau_{max}$=3168 [ns]

Figure 37:
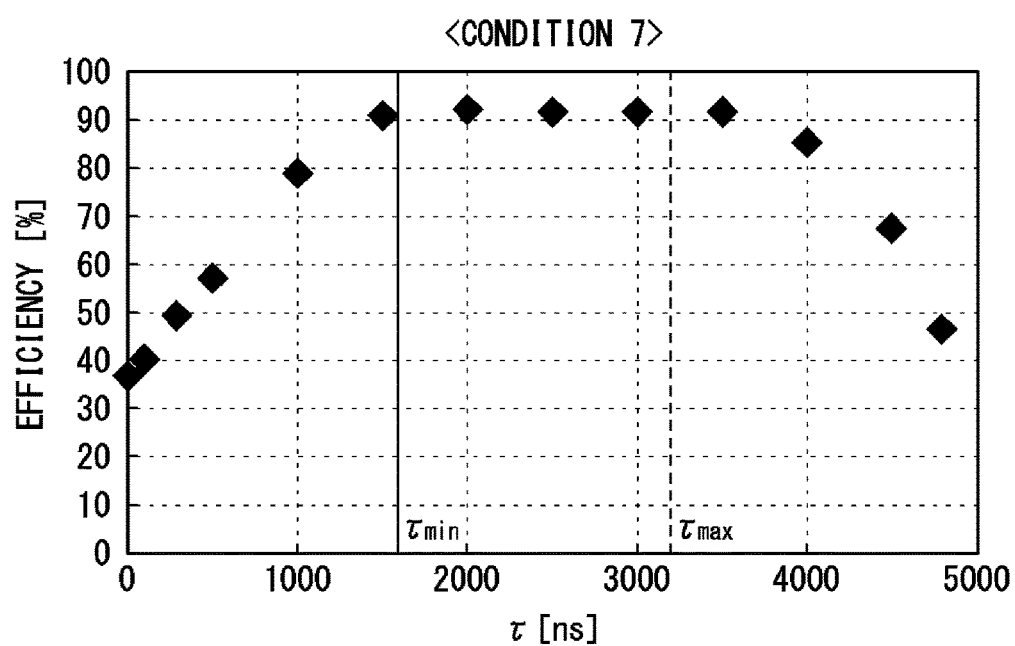
FIG. 37 is a graph showing the relationship between dead time $\tau$ [ns] and efficiency [%] in the case of condition 7.

FIG. 37 is a graph showing the relationship between the dead time $\tau$ [ns] and efficiency [%] in the case of the condition 7. When the calculated $\tau_{min}$ and $\tau_{max}$ are plotted on the graph, it is found that these values correspond to a range in which the efficiency is excellent on the characteristics shown in the graph.

Figure 38:
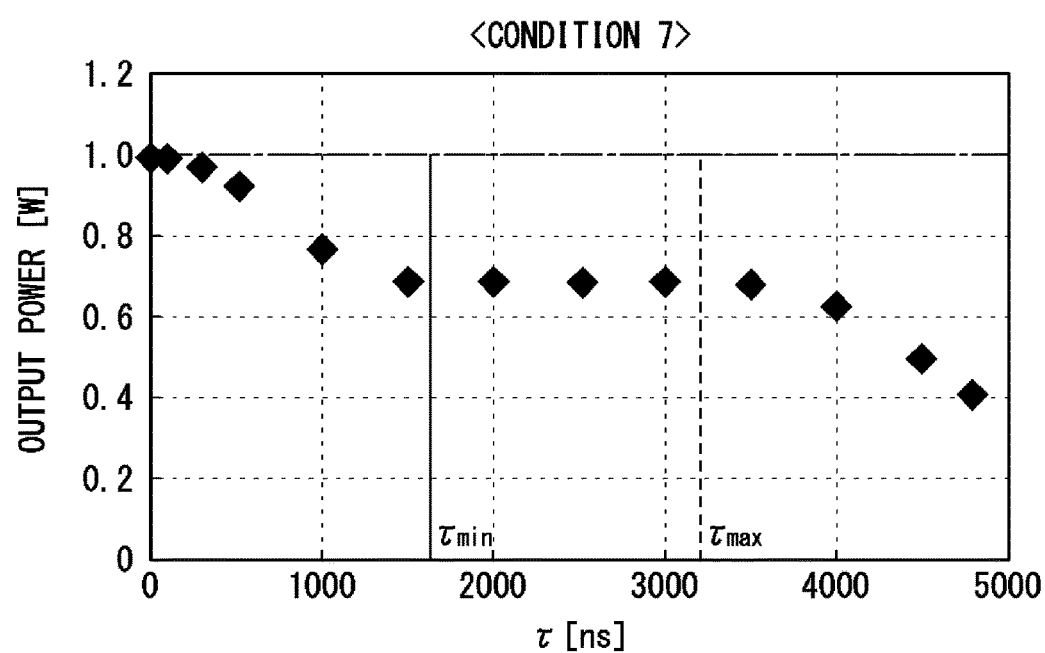
FIG. 38 is a graph showing the relationship between dead time $\tau$ [ns] and output power [W] of the transformer in the case of condition 7.

FIG. 38 is a graph showing the relationship between the dead time $\tau$ [ns] and output power [W] of the transformer in the case of the condition 7. When the calculated $\tau_{min}$ and $\tau_{max}$ are plotted on the graph, it is found that these values correspond to a range in which stable high output is achieved on the characteristics shown in the graph.

<Condition 8>
Circuit configuration: "6C2L"
Inductance L of inductors L1 and L2=7.5 [mH]
Resistance $R_3$ of load=15625 [Ω]
Floating capacitance $C_{DS}$=5 [pF]

In the case of the above condition 8, the minimum value and the maximum value of the dead time τ are calculated as follows on the basis of expressions (15) and (17).

Minimum value $\tau_{min}$=370 [ns]
Maximum value $\tau_{max}$=2528 [ns]

Figure 39:
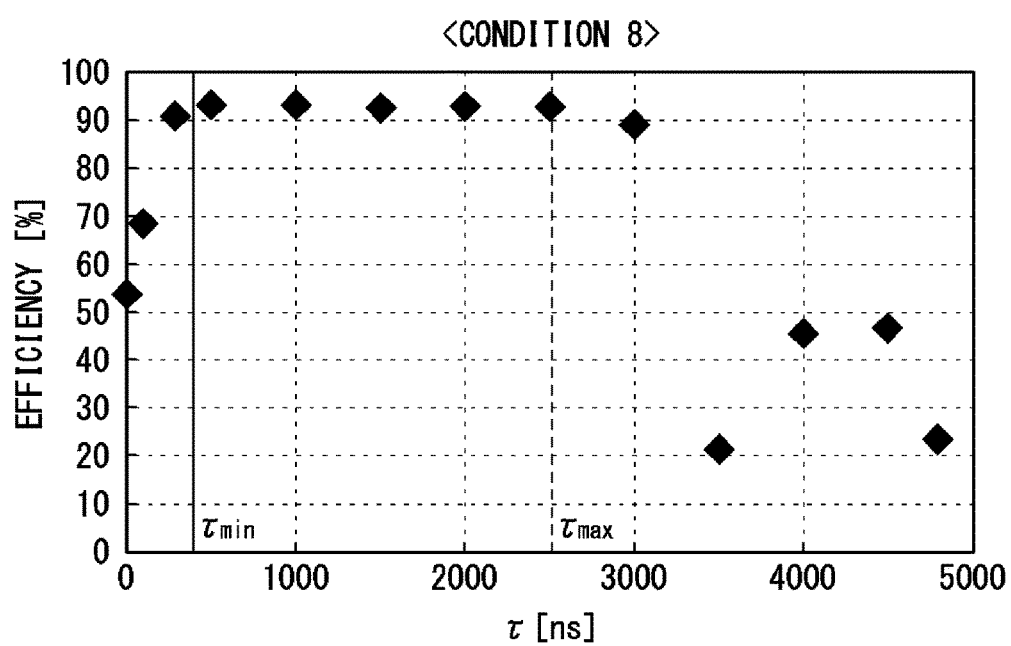
FIG. 39 is a graph showing the relationship between dead time $\tau$ [ns] and efficiency [%] in the case of condition 8.

FIG. 39 is a graph showing the relationship between the dead time τ [ns] and efficiency [%] in the case of the condition 8. When the calculated $\tau_{min}$ and $\tau_{max}$ are plotted on the graph, it is found that these values correspond to a range in which the efficiency is excellent on the characteristics shown in the graph.

Figure 40:
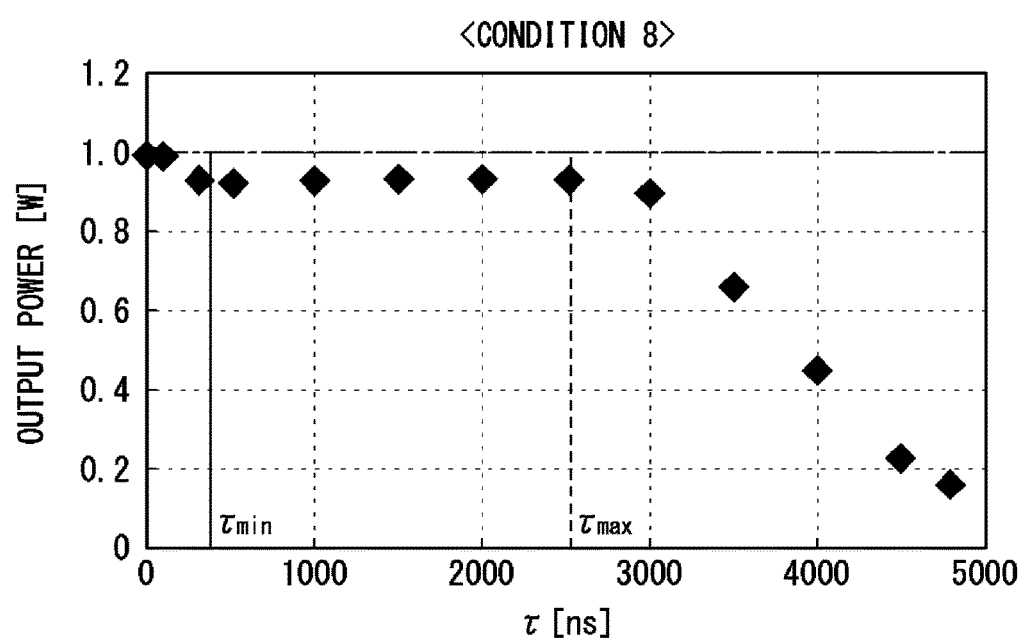
FIG. 40 is a graph showing the relationship between dead time $\tau$ [ns] and output power [W] of the transformer in the case of condition 8.

FIG. 40 is a graph showing the relationship between the dead time τ [ns] and output power [W] of the transformer in the case of the condition 8. When the calculated $\tau_{min}$ and $\tau_{max}$ are plotted on the graph, it is found that these values correspond to a range in which stable high output is achieved on the characteristics shown in the graph.

In the above conditions 1 to 8, the value of the floating capacitance $C_{DS}$ is common among a plurality of capacitors. Hereinafter, a case where a plurality of capacitors have different floating capacitances $C_{DS}$ will be verified.

<Condition 9>
Circuit configuration: "4C2L"
Inductance L of inductors L1 and L2=15 [mH]
Resistance $R_3$ of load=15625 [Ω]
Floating capacitances $C_{DS}$=17 [pF], 10 [pF], 10 [pF], 3 [pF]
Floating capacitance $\Sigma C_{DS}$ as a whole: 40 [pF]

In the case of the above condition 9, the minimum value and the maximum value of the dead time τ are calculated as follows on the basis of expressions (15) and (17).

Minimum value $\tau_{min}$=1063 [ns]
Maximum value $\tau_{max}$=2760 [ns]

Figure 41:
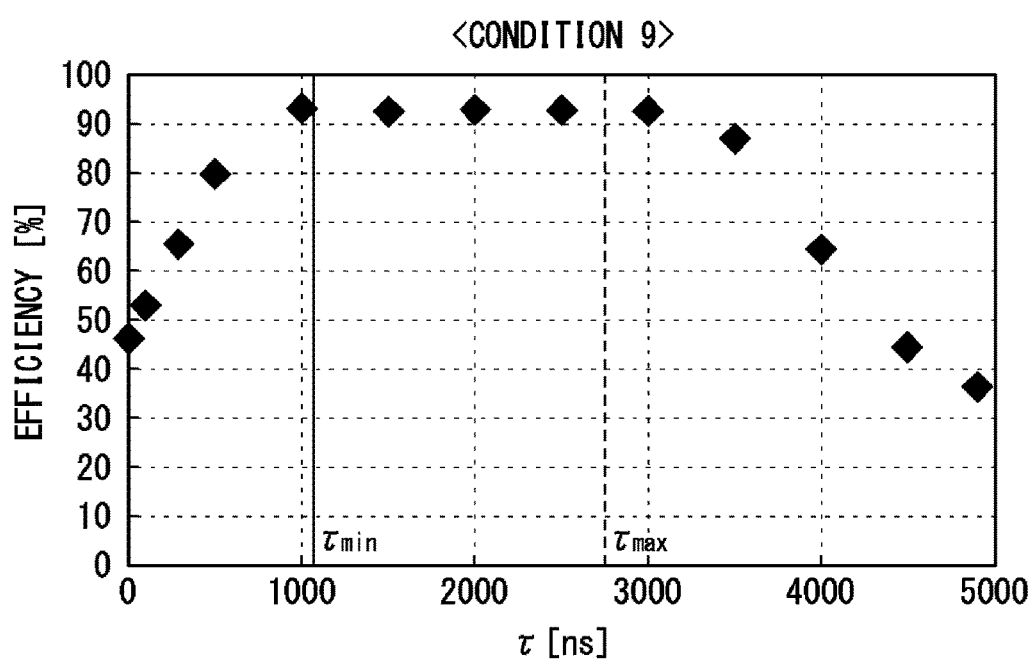
FIG. 41 is a graph showing the relationship between dead time $\tau$ [ns] and efficiency [%] in the case of condition 9.

FIG. 41 is a graph showing the relationship between the dead time τ [ns] and efficiency [%] in the case of the condition 9. When the calculated $\tau_{min}$ and $\tau_{max}$ are plotted on the graph, it is found that these values correspond to a range in which the efficiency is excellent on the characteristics shown in the graph.

Figure 42:
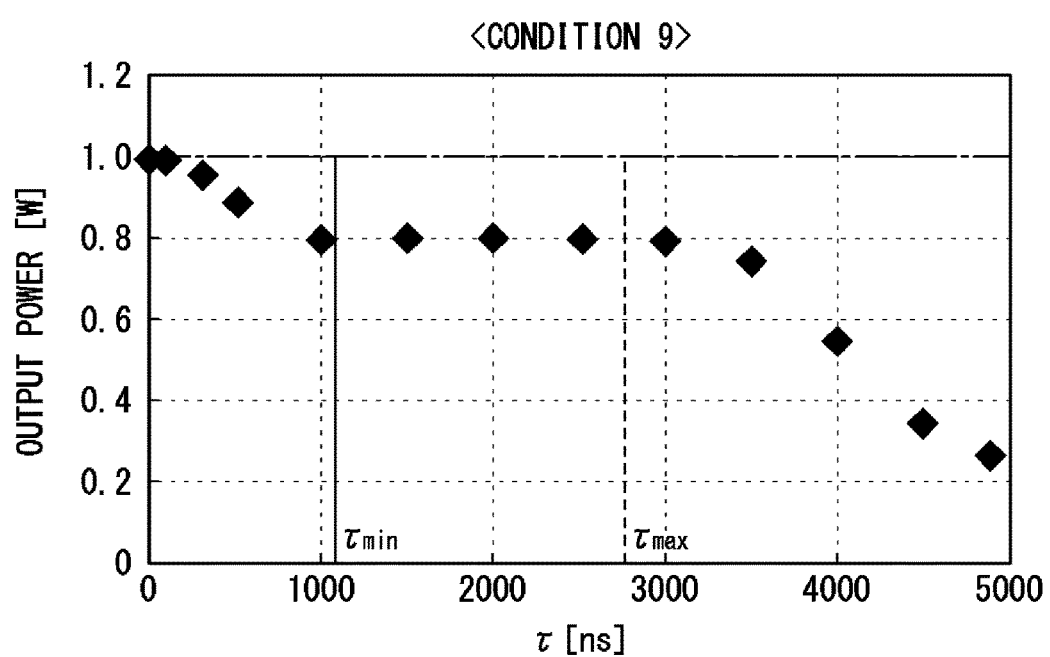
FIG. 42 is a graph showing the relationship between dead time $\tau$ [ns] and output power [W] of the transformer in the case of condition 9.

FIG. 42 is a graph showing the relationship between the dead time τ [ns] and output power [W] of the transformer in the case of the condition 9. When the calculated $\tau_{min}$ and $\tau_{max}$ are plotted on the graph, it is found that these values correspond to a range in which stable high output is achieved on the characteristics shown in the graph.

<Condition 10>
Circuit configuration: "4C2L"
Inductance L of inductors L1 and L2=15 [mH]
Resistance $R_3$ of load=15625 [Ω]
Floating capacitances $C_{DS}$=12 [pF], 5 [pF], 15 [pF], 8 [pF]
Floating capacitance $\Sigma C_{DS}$ as a whole: 40 [pF]

In the case of the above condition 10, the minimum value and the maximum value of the dead time τ are calculated as follows on the basis of expressions (15) and (17).

Minimum value $\tau_{min}$=1063 [ns]
Maximum value $\tau_{max}$=2760 [ns]

Figure 43:
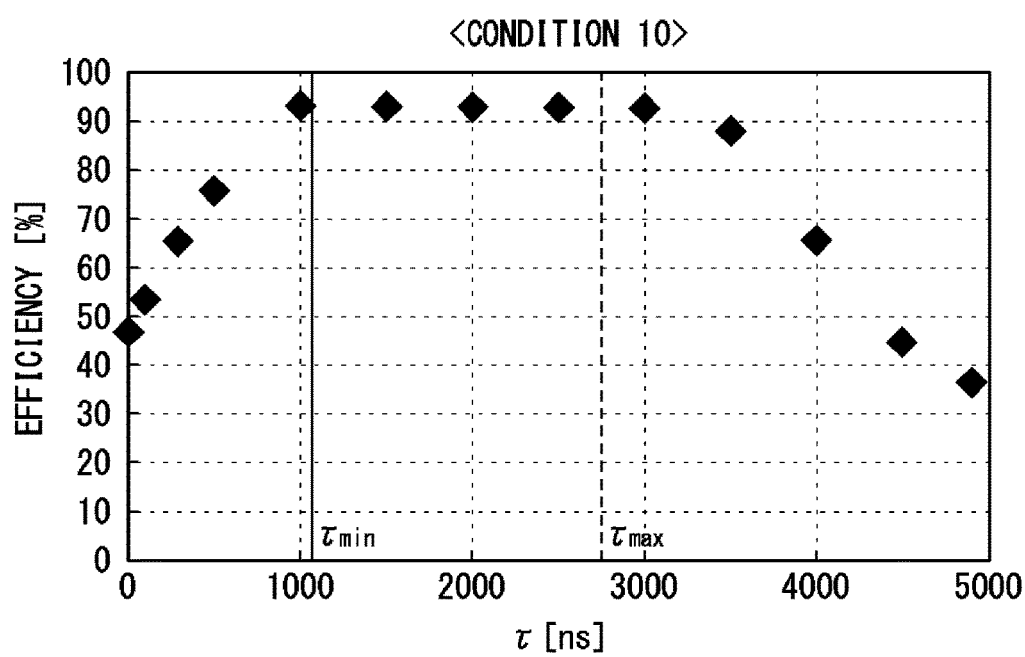
FIG. 43 is a graph showing the relationship between dead time $\tau$ [ns] and efficiency [%] in the case of condition 10.

FIG. 43 is a graph showing the relationship between the dead time τ [ns] and efficiency [%] in the case of the condition 10. When the calculated $\tau_{min}$ and $\tau_{max}$ are plotted on the graph, it is found that these values correspond to a range in which the efficiency is excellent on the characteristics shown in the graph.

Figure 44:
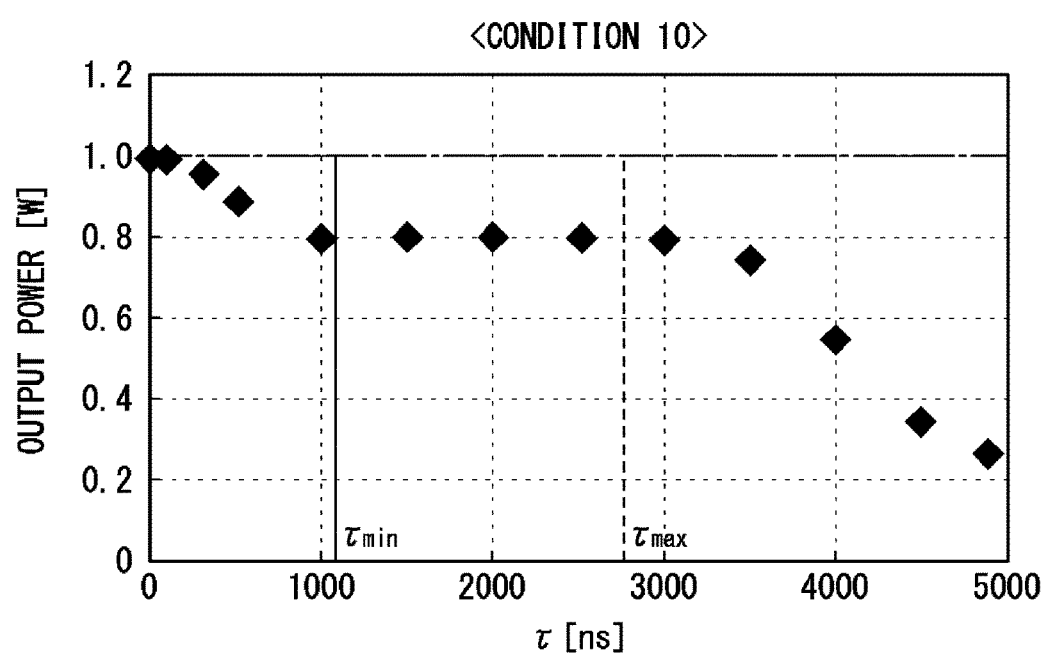
FIG. 44 is a graph showing the relationship between dead time $\tau$ [ns] and output power [W] of the transformer in the case of condition 10.

FIG. 44 is a graph showing the relationship between the dead time τ [ns] and output power [W] of the transformer in the case of the condition 10. When the calculated $\tau_{min}$ and $\tau_{max}$ are plotted on the graph, it is found that these values correspond to a range in which stable high output is achieved on the characteristics shown in the graph.

As described above, by determining the dead time τ on the basis of the relationships expressed by expressions (15) and ()17), the transformer can achieve excellent efficiency and stable high output.

<<Supplement>>

It is noted that the embodiment disclosed herein is merely illustrative in all aspects and should not be recognized as being restrictive. The scope of the present invention is defined by the scope of the claims and is intended to include meaning equivalent to the scope of the claims and all modifications within the scope.

REFERENCE SIGNS LIST 1 transformer
1f front stage circuit
1r rear stage circuit
2 AC power supply, power supply
3 control section
4 switch device
C1 to C5 capacitor
$C_6$ capacitance
D1 to D4, D11, D12 diode
L1, L2 inductor
M1, M2 connection point
N1 to N7, N11 to N13 node
Px first output port
Py second output port
R load
R1, R2 bleeder resistor
$R_3$ resistance
Sr1, Sr2, Sb1, Sb2 switch
SW1 to SW4 switch

The invention claimed is:

1. A transformer provided between a power supply and a load, and composed of a front stage circuit and a rear stage circuit, the transformer comprising:
the front stage circuit comprising:
a switch series unit composed of a plurality of switches, the plurality being a multiple of 2, connected in series with each other, the plurality of switches including odd-numbered switches and even-numbered switches as seen from one end of the switch series unit, the odd-numbered switches and the even-numbered switches being configured to be alternately turned ON, the switch series unit being connected in parallel to the power supply, and
under a condition that mutual connection points of the respective switches and points at both ends of the switch series unit are regarded as nodes, a number of nodes being (m) in total, and the nodes are seen in order of 1 to $m^{th}$ from one end of the switch series unit, capacitors provided on at least one electrical path of a first electrical path and a second electrical path, the first electrical path being configured to combine odd nodes and connect the odd nodes to a first output port, the second electrical path being configured to combine even nodes and connect the even nodes to a second output port, the capacitors corresponding to at least (m−1) nodes;
the rear stage circuit comprising:
an element series unit composed of a pair of semiconductor elements that are connected in series to each other and perform conducting operations of mutually opposite polarities, one of both ends of the element series unit being connected to the first output port while the other end thereof being connected to the second output port, and inductors provided on at least one electrical path of a third electrical path and a fourth electrical path, the third electrical path being configured to combine two additional nodes that are points at the both ends of the element series unit and to connect the two additional nodes to one end of the load, the fourth electrical path being configured to connect a third additional node that is a mutual connection point of the pair of semiconductor elements to another end of the load, the inductors being present so as to correspond to at least two of the three additional nodes; and a control section configured to control ON/OFF operations of the switches.

2. The transformer according to claim 1, wherein under a condition that a time period from a dead-time start time to a dead-time end time is a dead time $\tau$, the dead-time start time being a time at which control for the odd-numbered switches and control for the even-numbered switches are both turned OFF, the dead-time end time being a time at which control for either the odd-numbered switches or the even-numbered switches is turned ON, the control section, after the dead-time start time, calculates a first half time ($\tau_1$) and a second half time($\tau_2$), the first half time ($\tau_1$) being calculated on the basis of electric charges that move from the inductors to floating capacitances of the switches while one of the semiconductor elements is in a conductive state, the second half time ($\tau_2$) being calculated on the basis of electric charges that move from the inductors to the floating capacitances of the switches while the other semiconductor element is in a conductive state, and the control section determines the dead time ($\tau$) on the basis of the first half time ($\tau_1$) and the second half time ($\tau_2$).

3. The transformer according to claim 2, wherein the control section terminates the dead time ($\tau$) before the electric charges that have moved to the floating capacitances return to the inductors.

4. The transformer according to claim 3, wherein assuming that a switching cycle of the switches is (T), an inductance of the inductors is (L), and a resistance value of the load is $R_3$, the dead time ($\tau$) satisfies the following relationship:

$$\tau_1+\tau_2 \leq \tau \leq \tau_0+(\tau_2/2)+\tau_1$$

where $$\tau_0 = \frac{T}{4} - \frac{L}{2R_3}$$

$$\tau_1 = \frac{T}{2} + \frac{L}{R_3} - \frac{1}{2}\sqrt{\left(T+\frac{2L}{R_3}\right)^2 - 32L\sum_{n=1}^{n} C_{nDS}}$$

$$\tau_2 = \frac{T}{2} - \frac{L}{R_3} - \frac{1}{2}\sqrt{\left(T-\frac{2L}{R_3}\right)^2 - 32L\sum_{n=1}^{n} C_{nDS}}$$

where (n) denotes the number of floating capacitances ($C_{DS}$), ($C_{nDS}$) denotes an n-th floating capacitance, a sign of a value in each radical sign is plus, and $\tau_1 < \tau_2$ is satisfied.

5. The transformer according to claim 3, wherein under a condition that a switching cycle of the switches is (T), an inductance, of inductances of the inductors, that is dominant for the dead time ($L_1$), and a resistance value of the load is ($R_3$), the dead time ($\tau$) satisfies the following relationship:

$$\tau_1+\tau_2 \leq \tau \leq \tau_0+\tau_1$$

where $$\tau_0 = \frac{T}{4} - \frac{L_1}{4R_3}$$

$$\tau_1 = \frac{T}{4} + \frac{L_1}{4R_3} - \frac{1}{4}\sqrt{\left(T+\frac{L_1}{R_3}\right)^2 - 32L_1\sum_{n=1}^{n} C_{nDS}}$$

$$\tau_2 = \frac{T}{4} - \frac{L_1}{4R_3} - \frac{1}{4}\sqrt{\left(T-\frac{L_1}{R_3}\right)^2 - 32L_1\sum_{n=1}^{n} C_{nDS}}$$

where (n) denotes the number of floating capacitances ($C_{DS}$), ($C_{nDS}$) denotes an n-th floating capacitance, a sign of a value in each radical sign is plus, and $\tau_1 < \tau_2$ is satisfied.

* * * * *